United States Patent [19]
Kido

[11] Patent Number: 5,834,130
[45] Date of Patent: Nov. 10, 1998

[54] ORGANIC ELECTROLUMINESCENT DEVICE

[75] Inventor: Junji Kido, Yonezawa, Japan

[73] Assignee: Sumitomo Electric Industries, Ltd., Osaka, Japan

[21] Appl. No.: 591,432

[22] PCT Filed: Feb. 23, 1995

[86] PCT No.: PCT/JP95/00289

§ 371 Date: Aug. 28, 1996

§ 102(e) Date: Aug. 28, 1996

[87] PCT Pub. No.: WO95/33014

PCT Pub. Date: Dec. 7, 1995

[30] Foreign Application Priority Data

May 26, 1994 [JP] Japan .................................. 6-112502

[51] Int. Cl.$^6$ .................................................. H05B 33/00
[52] U.S. Cl. ........................... 428/690; 428/917; 313/506
[58] Field of Search ................................. 428/690, 917; 313/504, 506

[56] References Cited

PUBLICATIONS

Appled Physics Letter (1994), vol. 64, No. 7, Feb. 14, 1994, Junji Kido et al. pp. 815–817.
Applied Physics Letter (1993), Part 2, Jul. 1, 1993, vol. 32, No. 7A, Junji Kido et al. pp. 917–920.
Applied Physics Letter (1993), vol. 63, No. 19, Nov. 8, 1993, Jinji Kido et al. pp. 2627–2629.

Primary Examiner—Charles Nold
Attorney, Agent, or Firm—Beveridge, DeGrandi, Weilacher & Young, L.L.P.

[57] ABSTRACT

The first organic electroluminescent device is prepared by laminating the hole-transport luminescent layer 1 in which a dye is molecularly dispersed, and the electron-transport layer 2 containing a triazole derivative of the following formula (1). The second organic electroluminescent device has the layer containing the above triazole derivative. The third organic electroluminescent device wherein the layer containing the triazole derivative is interposed between the electron-transport layer and a hole-transport layer.

Every device is excellent in luminous efficiency, luminance and stability, realizing blue light emission, the multi-color displays and white light emission due to three primary colors.

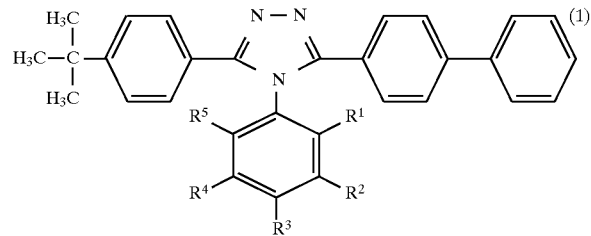

wherein the numeral references have the same meanings stated in specification.

8 Claims, 17 Drawing Sheets

ORGANIC ELECTROLUMINESCENT DEVICE

TECHNICAL FIELD

The present invention relates to an organic electroluminescent device.

BACKGROUND ART

It has been considered that light emission of an organic electroluminescent device is caused by the phenomenon where holes and electrons injected from electrodes are combined within a luminescent layer to generate excitons, and the excitons excite molecules of luminescent materials constituting the luminescent layer. By employing fluorescent dye as a luminescent material, there can be obtained an emission spectrum as an electroluminescence, being equivalent to the photoluminescence of the dye molecules.

Tang and Vanslyke recently proposed a device comprising two layers of a hole-transport layer and an electron-transport luminescent layer, which efficiently emits green light at a lower voltage (about 10 V) compared with the conventional organic electroluminescent devices having single-layer structure [C. W. Tang and S. A. Vanslyke; Appl. Phys. Lett., 51 (1987) 913]. This device is composed of an anode, a hole-transport layer, an electron-transport luminescent layer and a cathode, all of which are formed in this order on a glass substrate.

In this device, the hole-transport layer not only allows holes to be injected from the anode into the electron-transport luminescent layer, but prevents electrons injected from the cathode from escaping into the anode without combining with the holes, confining the electrons in the electron-transport luminescent layer. This electron confinement facilitates the combination of the holes and the electrons compared with conventional single-layer structure devices, resulting in substantial decrease in drive voltage.

Saito et al. showed that not only an electron-transport layer but a hole-transport layer can be a luminescent layer in a two-layer structure device [C. Adachi, T. Tsutsui and S. Saito; Appl. Phys. Lett., 55 (1989) 1489].

Saito et al. also proposed an organic electroluminescent device having a three-layer structure wherein an organic luminescent layer is interposed between a hole-transport layer and an electron-transport layer [C. Adachi, S. Tokito, T. Tsutsui and S. Saito; Jpn. J. Appl. Phys., 27 (1988) L269].

The two-layer structure device of Saito et al. is composed of an anode, a hole-transport luminescent layer, an electron-transport layer and a cathode, all of which are formed in this order on a glass substrate. In contrast to the device of Tang et al., the electron-transport layer not only allows electrons to be injected from the cathode into the hole-transport luminescent layer, but prevents the holes injected from the anode from escaping into the cathode without combining with the electrons, confining the holes in the hole-transport luminescent layer. This hole confinement leads to substantial decrease in drive voltage, as in the device of Tang et al.

The three-layer structure device of Saito et al. was attained by a further improvement for the device of Tang et al. The above device is composed of an anode, a hole-transport layer, a luminescent layer, an electron-transport layer and a cathode, all of which are formed in this order on a glass substrate. The hole-transport layer confines electrons in the luminescent layer, and the electron-transport layer confines holes in the luminescent layer. As a result, the combination of the electrons and the holes within the luminescent layer is more efficient than the two-layer structure device. Further, the electron-transport layer and the hole-transport layer prevent the excitons generated by the above combination from escaping into either of the anode and the cathode. Therefore, the three-layer structure device of Saito et al. may further increase the luminous efficiency.

Examples of the hole-transport materials which constitute these organic electroluminescent devices include aromatic tertiary amines such as triphenylamine. Examples of the electron-transport materials are oxadiazoles. Examples of the luminescent materials are tetraphenybutadiene derivatives, tris(8-quinolinolato)aluminum (III) complex, distyrylbenzene derivatives and distyrylbiphenyl derivatives.

Advantages of the above organic electroluminescent devices are that they can emit light of high luminance at a lower voltage than conventional electroluminescent devices employing inorganic luminescent material; that they can easily increase their surface area because the respective layers can be formed not only by deposition but solution coating; and that they can emit light of multi-color depending upon the molecular design for organic molecule. Each device, however, has the disadvantage that the luminance significantly lowers with a long-term emission. It is therefore the urgent problems to improve the stability and to extend the lifetime.

In the meantime, conventional electroluminescent devices have difficulties in obtaining blue light emission, irrespective of organic/inorganic and single/plural layer.

Specifically, it is difficult to produce inorganic devices because inorganic luminescent materials which have a wide band gap required for blue light emission are available on a limited basis and, such a material is often accompanied by technical difficulties in crystal growth and the formation of thin layer.

Whereas in the organic material, although the multi-color due to molecular design can be obtained as described above, known materials being capable of emitting blue light are available on a limited basis. There are merely anthracene and distyrylbenzene derivative, both of which are poor in luminous efficiency. Thus, many difficulties will arise in producing organic devices for practical application.

Moreover, every conventional electroluminescent device is of monochromatic light. It is therefore impossible presently to realize, with a single device, two or more emission spectrums permitting multi-color displays and white light emission due to three primary color emissions: R (Red); G (Green); and B (Blue).

In order to solve the above problem, Ogura et al. proposed a three-layer structure device employing a bis-di(p-tolyl) aminophenyl-1,1-cyclohexane being diamine derivative as a hole-transport layer, a 1,1-di(p-methoxyphenyl)-4,4-diphenylbutadiene being tetraphenylbutadiene derivative as a luminescent layer and a 2-(4-biphenylyl)-5-(4-tert-butylphenyl)-1,3,4-oxadiazole being oxadiazole derivative as an electron-transport layer [Sharp Technical Journal, 52 (3), 15–18 (1992)]. This device has a peak of emission spectrum at wave length of 480 nm and 590 nm, and emits white light. The light having the wavelength of 480 nm is due to the luminescent layer having hole-transport property, while the light having the wave length of 590 nm is due to the hole-transport layer. Ogura et al. described that the mechanism of the light emission from the hole-transport layer is based on the diffusion of excitons from the luminescent layer.

Mori et al. proposed an organic electroluminescent device having a single luminescent layer in which a luminescent material, such as a coumarin 6 and a coumarin 7 being known as a laser dye, and an oxadiazole derivative as an electron-transport material are molecularly dispersed in a high-molecular poly(N-vinylcarbazole) which serves as a hole-transport material and a resin binder. It is their opinion that various color light emissions are available by selecting the dye to be molecularly dispersed in the luminescent layer [Oyo Buturi 61(10), 1044–1047 (1992)].

This device may realize multi-color displays and white light emission due to three primary colors of R, G and B, by selecting the kind and the combination of dyes.

In contrast, the three-layer structure device of Ogura has the disadvantage of being unstable due to a large drop in luminescent intensity during the use. This instability appears to be caused by the deterioration, the coagulation and the crystallization due to the heat generated by the device emitting light.

In the single-layer structure device of Mori, the combination of the holes and the electrons is insufficient, failing to obtain high luminance. This might originate in being single-layer structure.

It is one object of the present invention to provide an organic electroluminescent device which is excellent in luminous efficiency, luminance and stability.

It is another object of the present invention to provide an organic electroluminescent device that emits, at sufficient efficiency, such color light, particularly blue light that has never been obtained or has been failed to emit it at high luminous efficiency.

It is still another object of the present invention to provide an organic electroluminescent device that can emit two or more light emissions whose spectrums are different from one another, and can realize multi-color displays and white light emission due to the three primary colors, which have been failed to emit them at sufficient luminous efficiency or have been unavailable.

DISCLOSURE OF THE INVENTION

A first organic electroluminescent device of the present invention comprising:
(i) an electron-transport layer which comprises:
  a single layer containing a 1,2,4-triazole derivative (hereinafter referred to as "s-TAZ") of the formula:

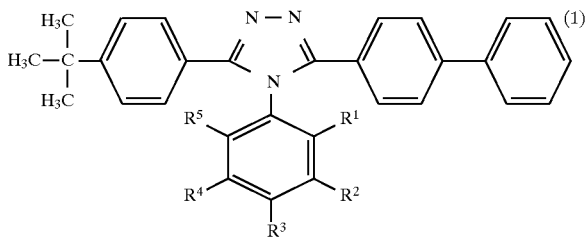

wherein $R^1$, $R^2$, $R^3$, $R^4$ and $R^5$ may be the same or different, each is hydrogen atom, alkyl, alkoxyl, aryl or aralkyl, and $R^1$, $R^2$, $R^3$, $R^4$ and $R^5$ are not hydrogen atoms at the same time, or,
  two layers comprising the layer containing the s-TAZ and a layer of a tris(8-quinolinolato)aluminum (III) complex; and (ii) a hole-transport luminescent layer in which at least one sort of dye is molecularly dispersed in a disperse medium.

In terms of the injection of electrons into the hole-transport luminescent layer, the surface of the electron-transport layer is generally required to be smooth. The s-TAZ is less liable to cause coagulation and crystallization than a variety of known electron-transport materials, such as a 3-(4-biphenylyl)-4-phenyl-5-(4-tert-butylphenyl-1,2,4-triazole (hereinafter referred to as "TAZ 0") of the formula:

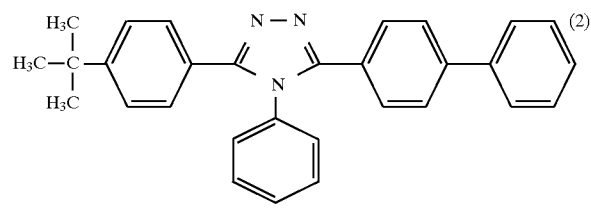

Therefore, the layer containing the s-TAZ hardly presents the alternation in surface roughness with time and is excellent in heat stability, retaining the smoothness for long periods. Thus the lifetime of the organic electroluminescent device of the first device is far prolonged than those having a layer prepared from the known electron-transport materials.

In addition, since the s-TAZ has good electron-transport property and exhibits superior layer-forming property in both deposition and solution coating, it is possible to form a thin layer free from pinholes, thus resisting short-circuit even when its thickness is significantly small. Further, the s-TAZ outperforms conventional electron-transport materials (e.g. the TAZ 0) in hole-blocking property to prevent the passage of holes.

Accordingly, the electron-transport layer containing the s-TAZ is superior to conventional single-layer electron-transport layers in the injection of carrier, particularly electrons, into the hole-transport luminescent layer. Therefore, in the first device comprising the electron-transport layer and the hole-transport luminescent layer, electrons and holes are efficiently combined in the hole-transport luminescent layer, so that the efficiency of the combination increases and the excitons can efficiency be confined into the hole-transport luminescent layer. As a result, the hole-transport luminescent layer emits light at high efficiency and high luminance.

In preparing the hole-transport luminescent layer, dye can readily be dispersed in a disperse medium by adjusting a solution, permitting the simultaneous disperse of plural dyes. Thus, depending upon the kind and the combination of dyes, it is possible to obtain the multi-color displays having good color purity, white light emission and natural light emission due to the three primary colors.

For the disperse medium used in the hole-transport luminescent layer, there can be employed a variety of known low-molecular compounds and polymers that are capable of forming solid layers, which may have carrier-transport property or not. Particularly when the polymers are used as a disperse medium, the heat-resisting property of the hole-transport luminescent layer is improved. Further, since the polymers are excellent in adherence to a substrate, such as ITO glasses and ITO films, the materials of the device resist deterioration, aggregation and crystallization due to the heat generated by the device emitting light, further prolonging the lifetime of the device.

A second organic electroluminescent device of the present invention has at least a layer containing the s-TAZ of the general formula (1). Owing to the s-TAZ layer superior in electron-transporting property and hole-blocking property, it is possible to facilitate the combination of electrons and holes, and to efficiently confine the excitons generated by the above combination into the electron-transport luminescent layer. This is effective for increasing the luminous efficiency and the luminance, as well as the stability associated with such properties. Particularly, the combination with known luminescent layers for blue light having high hole-transport property can raise the luminous efficiency and the luminance to a required level for practical applications, enabling to obtain the blue light emission having high luminance which has never been of practical use. Also, since the s-TAZ layer hardly present the alternation in surface roughness with time and is excellent in heat stability as previously described, the lifetime of the device can be significantly prolonged.

A third organic electroluminescent device of the present invention has the hole-transport layer and the electron-transport layer and a carrier-transport control layer being interposed therebetween, which contains the s-TAZ of the general formula (1) and selectively transports at least either of holes and electrons.

In the third device, due to the effect that the carrier-transport control layer confines excitons, it is possible to allow the hole-transport layer or the electron-transport luminescent layer to emit light at high luminance and high efficiency, as a luminescent layer. This leads to the increase in the luminous efficiency and the luminance, as well as the stability associated with such properties, thereby raising the luminous efficiency and luminance for blue light to a required level for practical applications.

By adjusting the thickness of the carrier-transport control layer, either or both of the hole-transport layer and the electron-transport layer emit light at high luminance and high efficiency. Therefore, by adding materials whose spectrum differ from each other to the respective layers, respectively, even a single device can emit more than two lights whose spectrums differ from one another, resulting in the multi-color displays and white light emission or the like due to the three primary colors of R, G and B.

As previously mentioned, the s-TAZ layer hardly presents the alternation in surface roughness with time and is excellent in heat stability, and therefore, the lifetime of the device can be significantly prolonged.

Thus, in accordance with the first to third organic electroluminescent devices of the present invention, it is possible to obtain light emissions being excellent in luminous efficiency, luminance and stability, particularly blue light emission, which have been failed to obtain at high luminous efficiency. It is also possible to emit, at high luminous efficiency, two or more light emissions whose spectrums are different from one another, the multi-color displays and white light emission due to the three primary colors, which have been failed to emit them at sufficient luminous efficiency and high luminance or have been unavailable.

BRIEF DESCRIPTION OF THE DRAWINGS

FIG. 1($b$) is a sectional view illustrating the device in which the electron-transport layer has the single-layer structure out of the first organic electroluminescent device of the present invention.

FIG. 2($b$) is a sectional view illustrating one embodiment of the third organic electroluminescent device of the present invention.

PREFERRED EMBODIMENTS OF THE INVENTION

Figure 1:
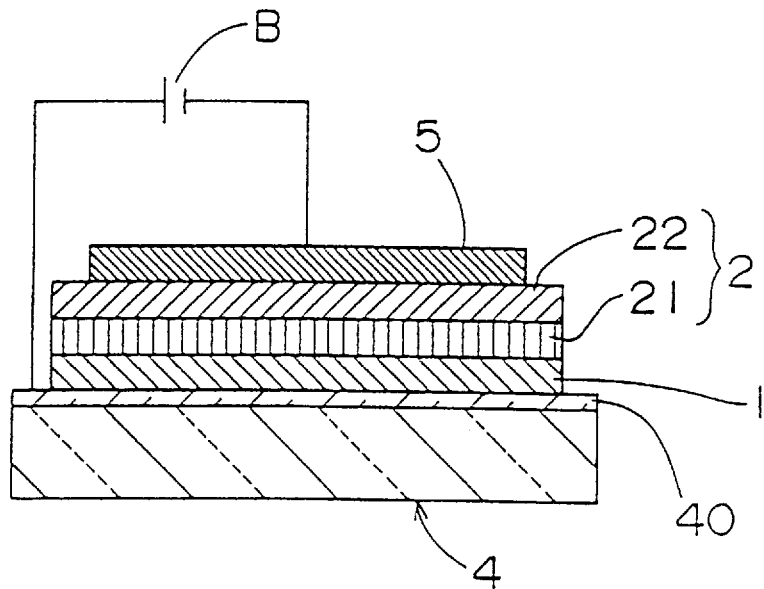
FIG. 1($a$) is a sectional view illustrating the device in which the electron-transport layer has the two-layer structure out of the first organic electroluminescent device of the present invention.
Figure 1:
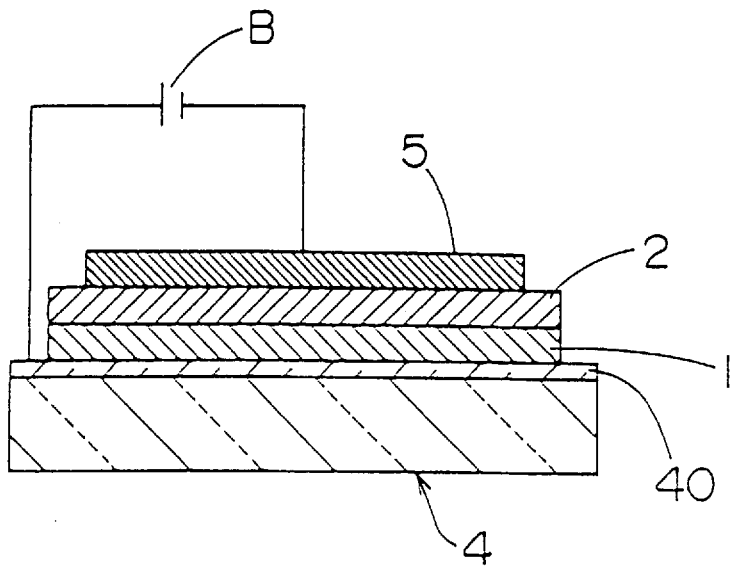

The following will describe the first organic electroluminescent device. In this device, the hole-transport luminescent layer in which at least one sort of dye is molecularly dispersed in a disperse medium, is composed only by the layer of the s-TAZ of the general formula (1), or is combined with the electron-transport layer comprising the layer of the s-TAZ and the layer of the tris(8-quinolinolato)aluminum (III) complex.

For the disperse medium used in the hole-transport luminescent layer, there can be employed a variety of the known low-molecular weight compounds and the known polymers, which may have carrier-transport property or not. When using the disperse medium having no carrier-transport property, it is required to molecularly disperse a hole-transport material having lower molecular weight that provides hole-transport property, together with a dye.

Suitable disperse mediums are polymers capable of raising the heat resistance of the hole-transport luminescent layer and are excellent in adherence to a substrate, such as ITO glasses and ITO films, as previously described.

Examples of the disperse mediums having carrier-transport property include poly(phenylene vinylene) and its derivative, polyalkylthiophene, poly(N-vinylcarbazole), poly(methylphenylsilane), and polymers having triphenylamine as a side-chain or a main-chain. The most preferred is the poly(N-vinylcarbazole) (hereinafter referred to as "PVK") of the formula:

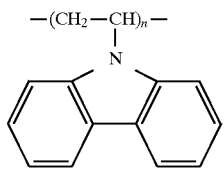

(3)

wherein n is polymerization degree, because its carrier-transporting property is stable. The polymerization degree n of the PVK is not specifically limited, but preferably about 20 to 5000. If it is less than 20, the heat resistance and the adhesion tend to be insufficient. On the other hand, if it exceeds 5000, the layer formation by solution coating might be difficult.

Examples of the disperse mediums having no carrier-transport property include a variety of polymers excellent in optical property, such as poly(methyl methacrylate), polycarbonate and polystyrene.

For the dye to be molecularly dispersed in the disperse medium, there can be employed various dyes which can be excited by excitons to emit fluorescence (e.g. the aforesaid dyes for laser). Exemplified examples are cyanine dye, xanthene dye, oxazine dye, coumarin derivative, perylene derivative, acridine dye, acridone dye and quinoline dye. Suitable compounds are a tetraphenylbutadiene (blue light emission, hereinafter referred to as "TPB") of the formula:

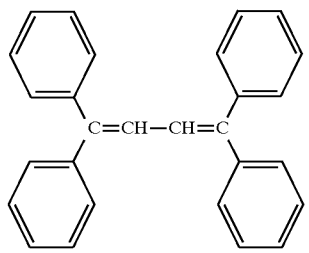

(4)

a coumarine 6 (green light emission) of the formula:

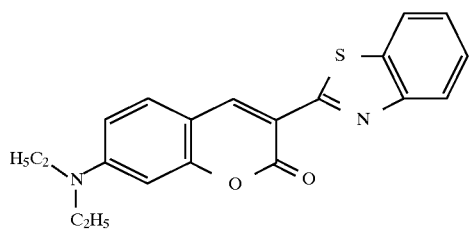

(5)

a coumarine 7 of the formula:

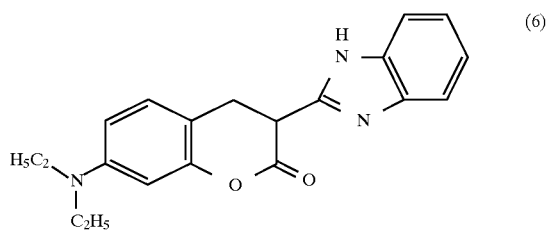

(6)

a 4-dicyanomethylene-2-methyl-6-p-dimethylaminostyryl-4H-pyran (orange emission, hereinafter referred to as "DCM") of the formula:

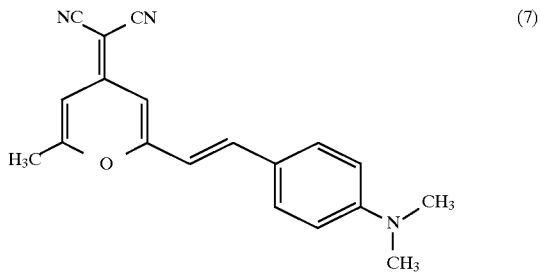

(7)

For white light emission, the combination of the TPB of the formula (4), the coumarine 6 of the formula (5) and the DCM of the formula (7) is appropriate. This combination allows the emission spectrum of the hole-transport luminescent layer to extend over the whole visible region of the wave length ranging from 400 to 700 nm, resulting in a good white light emission.

The proportion of the dye in the disperse medium is not specifically limited, but a preferable range can be set depending upon the kinds of the disperse medium and the dye, the luminescence intensity, the color tone and the like.

When the disperse medium having no carrier-transport property is used, it is suitable to molecularly disperse a triphenylamine derivative as a lower molecular hole-transport material. The most preferred is an N,N'-diphenyl-N,N'-bis(3-methylphenyl)-1,1'-biphenyl-4,4-diamine (hereinafter referred to as "TPD") of the formula:

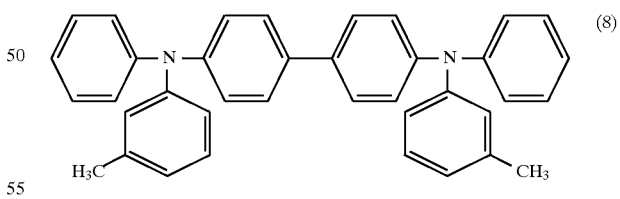

(8)

The hole-transport luminescent layer comprising the above respective components can be formed by solution coating. Specifically, a solution in which the layer materials such as the disperse medium and the dye are dissolved in a suitable solvent is applied on a substrate or another layer, followed by drying.

Suitable electron-transport layers used in combination with the hole-transport luminescent layer are those having single-layer structure which comprises one or more sorts of the s-TAZ of the formula:

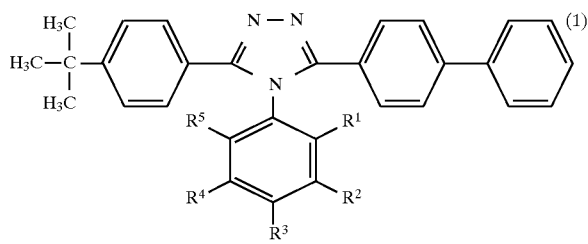

wherein $R^1$, $R^2$, $R^3$, $R^4$ and $R^5$ may be the same or different, each is hydrogen atom, alkyl, alkoxyl, aryl or aralkyl, and $R^1$, $R^2$, $R^3$, $R^4$ and $R^5$ are not hydrogen atoms at the same time, and those having two-layer structure in which the above s-TAZ layer and the layer containing the tris(8-quinolinolato)-aluminum (III) complex of the formula:

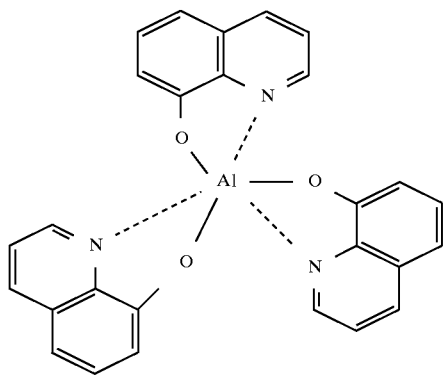

are laminated.

Owing to the s-TAZ layer superior in electron-transport property and hole-blocking property, as described above, it is possible to efficiently carry out the combination of electrons and holes within the hole-transport luminescent layer, and to efficiently confine the excitons generated by the above combination into the electron-transport luminescent layer. This leads to further improvement in the luminous efficiency and the luminance of the hole-transport luminescent layer compared with conventional electron-transport materials such as the TAZ 0.

In the general formula (1) for the s-TAZ, the substituted position and the substituted number are not particularly limited, but for the purpose of facility in syntheses, $R^2$, $R^3$ or $R^4$ is preferable for $R^1$ or $R^5$, which may be mono-, di- or trisubstituted. For the cases where the substituent is small, such as a lower alkyl, may be substituted at any of $R^1$, $R^2$, $R^3$, $R^4$ and $R^5$, and the number of substituted group may be anyone of 1 to 5.

A suitable value for $R^1$, $R^2$, $R^3$, $R^4$ or $R^5$ when it is alkyl is, for example, alkyl having 1 to 10 carbon atoms, such as methyl, ethyl, normal propyl, isopropyl, normal butyl, isobutyl, tertiary butyl, pentyl and hexyl. The most preferred are methyl and ethyl.

A suitable value for $R^1$, $R^2$, $R^3$, $R^4$ or $R^5$ when it is alkoxy is, for example, alkoxy having 1 to 10 carbon atoms, such as methoxy, ethoxy, normal propoxy, isopropoxy, normal butoxy, isobutoxy, tertiary butoxy, pentyloxy and hexyloxy. The most preferred are methoxy and ethoxy.

A suitable value for $R^1$, $R^2$, $R^3$, $R^4$ or $R^5$ when it is aryl is, for example, phenyl, tolyl, xylyl, biphenyl, o-ter-phenyl, naphthyl, anthryl and phenanthryl.

A suitable value for $R^1$, $R^2$, $R^3$, $R^4$ or $R^5$ when it is aralkyl is, for example, benzyl, α-phenethyl, β-phenethyl, 3-phenylpropyl, benzhydryl and trithyl.

Exemplified examples of the s-TAZ include a 3-(4-biphenylyl)-4-(4-ethylphenyl)-5-(4-tert-butylphenyl)-1,2,4-triazole (hereinafter referred to as "s-TAZ1") of the formula:

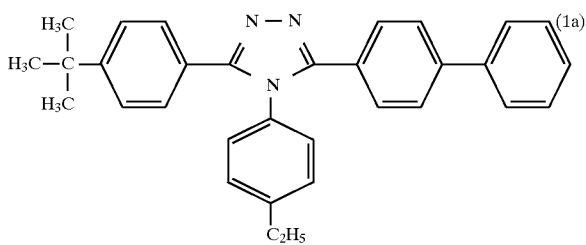

and 3-(4-biphenylyl)-4-(3-ethylphenyl)-5-(4-tert-buthylphenyl)-1,2,4-triazole (hereinafter referred to as "s-TAZ2") of the formula:

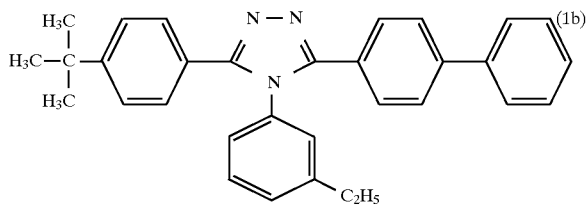

The thickness of the s-TAZ layer is not specifically limited, but if it is too thin, the hole-blocking property becomes insufficient. Therefore a certain thickness is required.

Suitable thickness range of the s-TAZ layers is not specifically limited. The deposited layer of the TAZ 0 of the aforesaid formula (2) preferably has the thickness range from 100 to 200 Å or more, in order to retain sufficient hole-blocking property.

On the other hand, the layer containing the s-TAZ has superior hole-blocking property, permitting the lower thickness range. For example, the deposited layer of the s-TAZ preferably has the thickness range from 100 to 150 Å or more, in order to retain sufficient hole-blocking property. Although its upper limit is not specifically limited, if it is too thick, the electron-transport property decreases. Therefore the thickness of not more than 1000 Å is appropriate.

The combination of the s-TAZ layer and the Alq layer of the formula (9) enables to improve the electron injection property to the hole-transport luminescent layer, obtaining the device having high luminous efficiency and high luminance.

The thickness of the Alq layer is not specifically limited, but preferably ranges from 100 to 1000 Å, in terms of the electron injection property and the electron-transport property to the hole-transport luminescent layer. When the Alq layer is laminated, the thickness of the s-TAZ layer may be below 100 Å because the Alq layer complements the hole-blocking property of the s-TAZ layer. Although the total thickness of both layers is not specifically limited, preferably ranges from about 200 to 1500 Å. If it is below 200 Å, the hole-blocking property tends to be insufficient. On the other hand, if it exceeds 1500 Å, the electron-transport property tends to decrease.

The s-TAZ layer may be prepared from one or more sorts of the s-TAZ, or be prepared by dispersing one or more sorts of the s-TAZ in a suitable binder. The Alq layer may be prepared by the Alq alone, or be prepared by dispersing the Alq in a suitable binder. Both layers may contain other materials such as various additives which do not inhibit the function of the electron-transport material (the s-TAZ, the Alq).

The s-TAZ layer and the Alq layer can be formed by gas phase deposition such as vacuum deposition, or the aforesaid solution coating.

The order in which the respective layers of the first device are laminated is not specifically limited.

However, when the polymer is used as a disperse medium in the hole-transport luminescent layer, if considered that the polymer is excellent in adhesion to a substrate, such as the ITO glass and the ITO film, and is formed exclusively by solution coating as previously described, it is preferable to laminate the hole-transport luminescent layer 1 and the electron-transport layer 2 in this order, on the anode 40 composed of a transparent conductive material such as ITO (indium-tin-oxide) being formed on the glass substrate 4, as shown in FIGS. 1(*a*) and 1(*b*).

The electron-transport layer 2 of FIG. 1(*a*) has the two-layer structure wherein the two layers of the s-TAZ layer 21 and the Alq layer 22 are laminated in this order, on the hole-transport luminescent layer 1. The electron-transport layer 2 of FIG. 1(*b*) has the single layer structure having the s-TAZ layer alone.

In FIGS. 1(*a*) and 1(*b*), the reference numerals 5 and B denote a cathode of metal deposited layer using Mg/Ag etc. and the power source for applying a drive voltage to the device, respectively.

The followings will describe the second organic electroluminescent device having the layer of the s-TAZ of the general formula (1).

The above s-TAZ layer contains at least one or more sorts of the s-TAZ. This layer may contain one or more sorts of the s-TAZ alone or may be prepared by dispersing one or more sorts of the s-TAZ into a suitable binder. Also, this layer may contain other ingredients such as additives, which do not affect the function of the s-TAZ.

The s-TAZ layer and the Alq layer can be formed by the aforesaid gas phase deposition such as vacuum deposition, or the aforesaid solution coating.

The thickness of the s-TAZ layer is not specifically limited, but preferably has a certain thickness because if it is too thin, the hole-blocking property becomes insufficient.

Suitable thickness range of the s-TAZ layer is not specifically limited. For example, the deposited layer of the s-TAZ preferably has the thickness range from about 100 to 150 Å or more, in order to retain sufficient hole-blocking property. Its upper limit is not specifically limited, however, since too large thickness decrease the electron-transport property, it is preferably not more than 1000 Å.

In the second organic electroluminescent device, the s-TAZ layer is essential, whereas other structural requirements are not specifically limited. Therefore, this device may have the conventional single-layer structure and the multi-layer structure. That is, any structure is applicable to this device.

When the second device has the multi-layer structure, materials constituting other layers than the s-TAZ layer can be selected from a variety of known materials for the respective layers. The thickness of each layer is not specifically limited. The respective layers can be formed by the aforesaid deposition or solution coating like in the s-TAZ layer, and they may be contain other ingredients such as resin binders and various additives, which do not affect the function of each layer.

In the second device, the s-TAZ layer exhibits superior electron-transport property and hole-blocking property as described above. Thus the combination of the s-TAZ layer and the hole-transport luminescent layer for blue light emission whose hole-transport property is high, can realize blue light emission having high luminance, which have been difficult to put into practical application. Additionally, as described above, the s-TAZ layer hardly presents the alternation in surface roughness with time and is excellent in heat stability, enabling to further prolong the lifetime of the device.

The layer of the PVK of the formula (3) is most suitable for the hole-transport luminescent layer for blue light. The high mobility of the PVK layer facilitates the movement of holes toward a cathode, thus failing to emit light. However, the blue light emission can be obtained by combing the PVK layer with the s-TAZ layer which effectively confine the excitons and has high hole-blocking property.

Further, the PVK performs the function of the hole-transport material as seen from its molecular structure, and also has heat resistance superior to the conventional hole-transport materials (e.g., the aforesaid low-molecular aromatic tertiary amine compounds), which results from being polymer. Accordingly, it is possible to form the hole-transport luminescent layer for blue light emission which hardly causes the deterioration and the crystallization during the storage or due to heat generated by the device emitting light.

Moreover, the PVK layer is excellent in adhesion to a substrate, such as ITO glass and ITO film.

Hence, the combination of the PVK layer being the hole-transport luminescent layer and the s-TAZ layer realizes an organic electroluminescent device for blue light emission for practical application, which is excellent in luminous efficiency, luminance and stability.

The polymerization degree n of the PVK is not specifically limited, but preferably ranges from about 20 to 5000. If it is below 20, the heat resistance and the adhesion tend to be insufficient. On the other hand, if it exceeds 5000, the layer formation by solution coating might be difficult.

The device having the s-TAZ layer and the PVK layer (hole-transport luminescent layer), combined with the Alq layer (electron-transport layer), results in more suitable embodiment. In this three-layer structure device, the Alq layer promotes the injection of electrons into the hole-transport luminescent layer to obtain blue light emission having higher luminance and higher efficiency.

Figure 2:
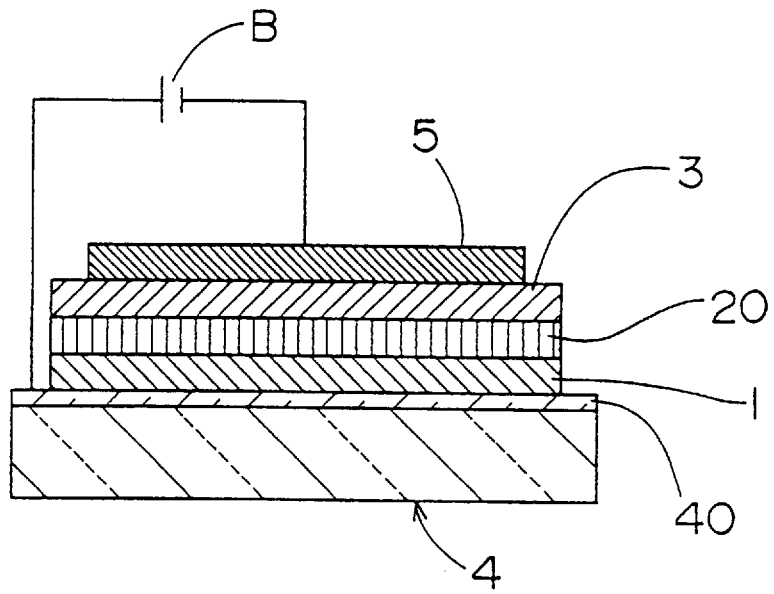
FIG. 2($a$) is a sectional view illustrating a suitable embodiment of the device having the three-layer structure out of the second organic electroluminescent device of the present invention.
Figure 2:
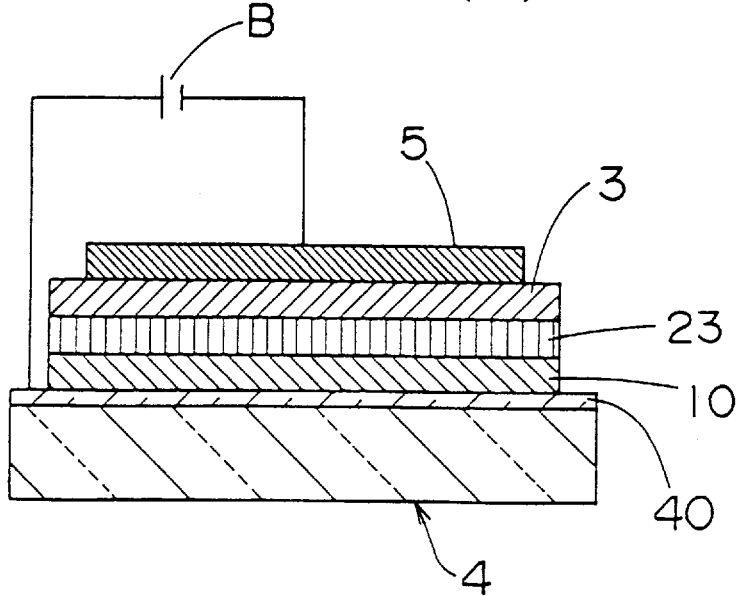

The layer structure of the three-layer device is not specifically limited. But if consideration is given to the fact that the PVK layer is excellent in adhesion to a substrate, such as ITO glass and ITO film, and is formed exclusively by solution coating, more preferred is one in which the three layers comprising the hole-transport luminescent layer (the PVK layer) 1, the s-TAZ layer 20 and the electron-transport layer (the Alq layer) 3 are laminated in this order, on the anode 40 of a transparent conductive material such as ITO (indium-tin-oxide) being formed on the glass substrate 4, as shown in FIG. 2(*a*) in which the reference numerals 5 and B have the same meanings as in the previous figures.

The thickness of the PVK layer 1 and the Alq layer 3 is not specifically limited, but most suitable range can be set depending upon the kind and the thickness of the s-TAZ used in combination.

Since the PVK is polymer, the PVK layer 1 is generally formed by solution coating. That is, a solution in which material containing the PVK is dissolved in a suitable solvent, is applied to a substrate or another layer and dried.

The Alq layer 3 is merely required to contain at least the Alq. Therefore, it may contain the Alq alone or may be prepared by dispersing the Alq in a suitable binder. The Alq layer 3 can be formed by solution coating or vacuum deposition.

The PVK layer 1 and the Alq layer 3 may contain other ingredients such as various additives, which do not inhibit the functions of the PVK and the Alq.

The followings will describe the third organic electroluminescent device having the three-layer structure wherein a carrier-transport control layer containing the s-TAZ of the general formula (1) is interposed between the hole-transport layer and the electron-transport layer.

This device is, for example, prepared by laminating the three layers comprising the hole-transport layer 10, the carrier-transport control layer 23 and the electron-transport layer 3 in this order or in the reverse order, on the anode 40 of a transparent conductive material such as ITO (indium-tin-oxide) being formed on the glass substrate 4, as shown in FIG. 2(*b*). It is essential that the layer 23 is interposed between the layers 10 and 3. In FIG. 2(*b*), reference numerals 5 and B have the same meanings as in the previous figures.

The carrier-transport control layer 23 contains at least one sort of the s-TAZ, and may be composed of at least one sort of the s-TAZ alone or may be prepared by dispersing at least one sort of the s-TAZ into a suitable resin. The layer 23 can be formed by aforesaid deposition or solution coating, and can contain other ingredients such as additives, which do not affect the function of the s-TAZ.

The carrier-transport control layer 23 functions such that either or both of the hole-transport layer 10 and/or electron-transport layer 3 emit(s) light at high luminance and high efficiency by selecting the material and the thickness of the layer 23, as previously described.

The function of the carrier-transport control layer 23 will be described through an example using a deposited layer of the s-TAZ (the s-TAZ layer) as a carrier-transport control layer, a deposited layer of the TPD (the TPD layer) as a hole-transport layer of the formula (8) and a deposited layer of the Alq of the formula (9) (the Alq layer) as an electron-transport luminescence layer.

In general, the carrier injection into an organic insulating layer is restricted by space charge. The amount of the electric current is proportional to the mobility of the carrier and the square of the electric field strength, and is inversely proportional to the cubic of the thickness of the organic insulating layer. That is, as the electric field strength and the mobility increase, the carrier injection is accelerated. As the thickness increases, the carrier injection are restricted.

Figure 6:
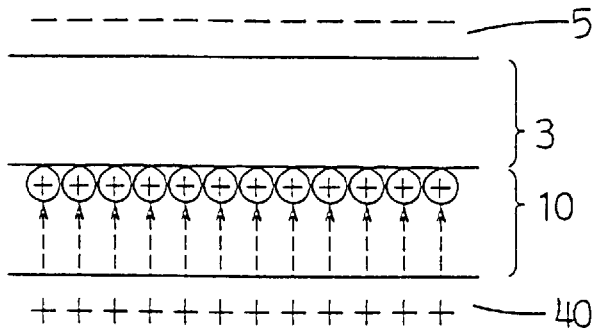
FIGS. 6($a$) to 6($c$) are schematic diagrams illustrating the principle of the light emission of the device having the two-layer structure wherein the TAZ layer is not interposed between the TPD layer (hole-transport layer) and the Alq layer (electron-transport layer).
Figure 6:
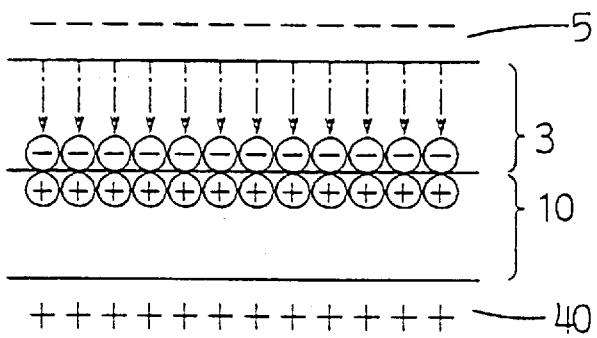
Figure 6:
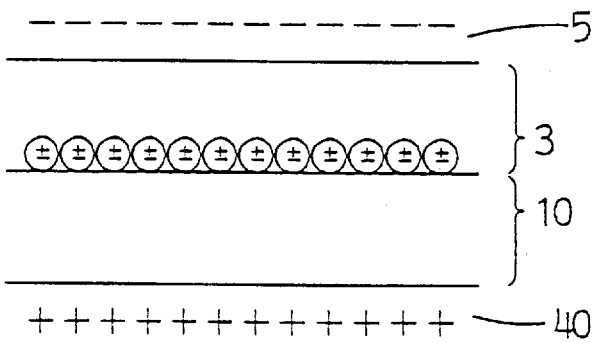
Figure 7:
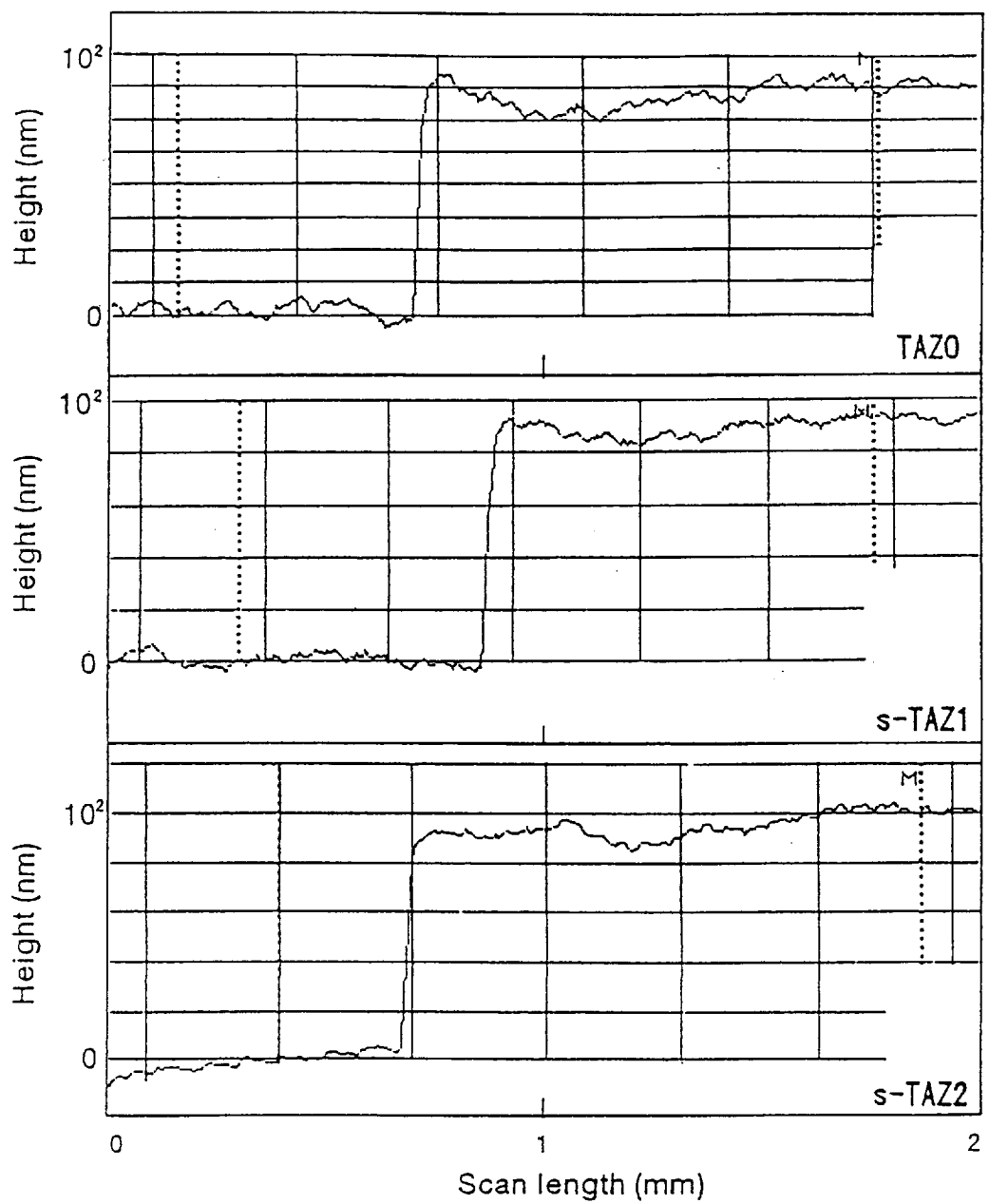
FIG. 7 is a graph illustrating the result of the surface condition of each deposited layer, measured immediately after each layer is allowed to stand in atmosphere, in order to evaluate the heat stability of the s-TAZ and the TAZ 0.
Figure 8:
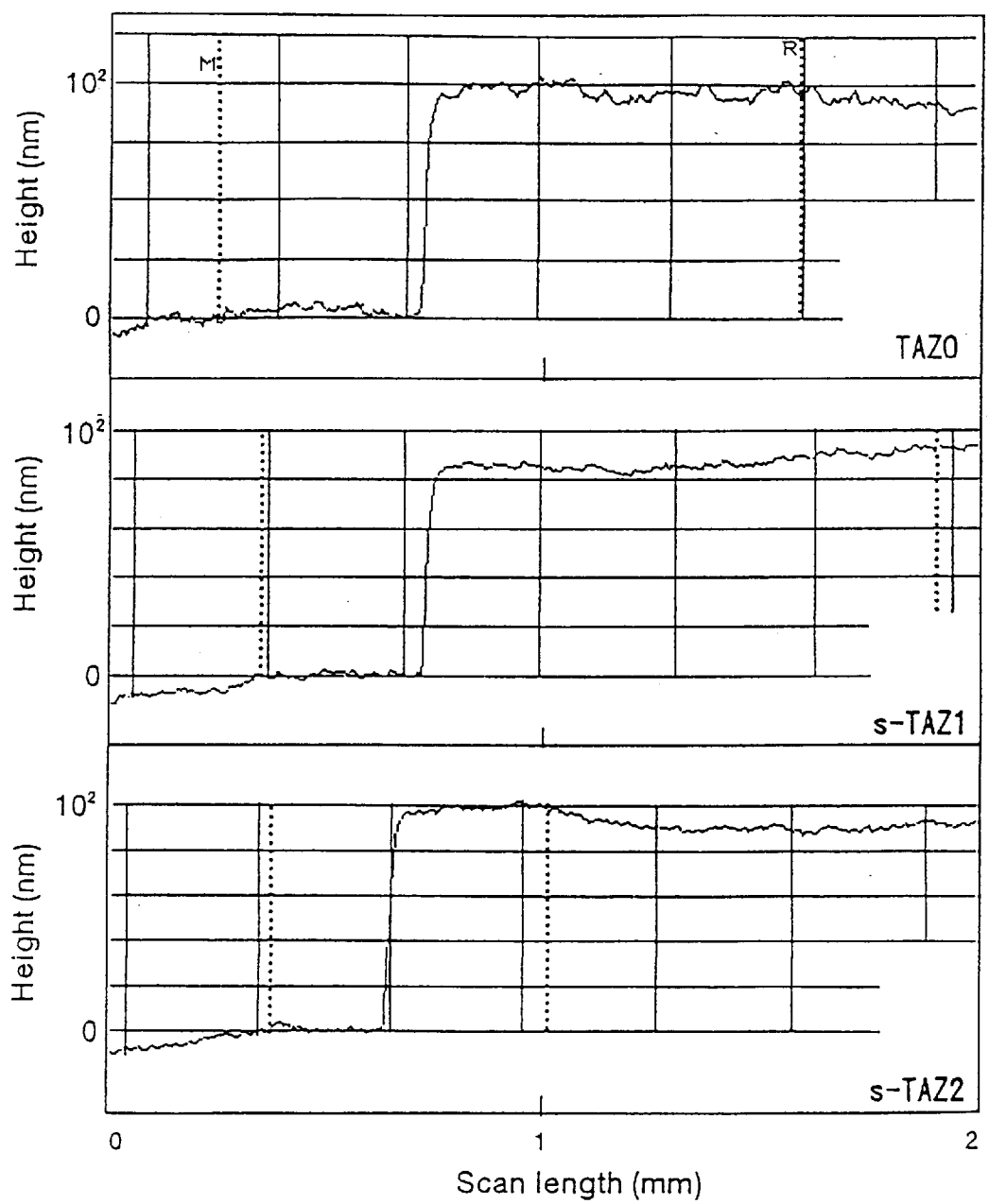
FIG. 8 is a graph illustrating the result of the surface condition of each deposited layer, measured after 24 hours from the standing in atmosphere.
Figure 9:
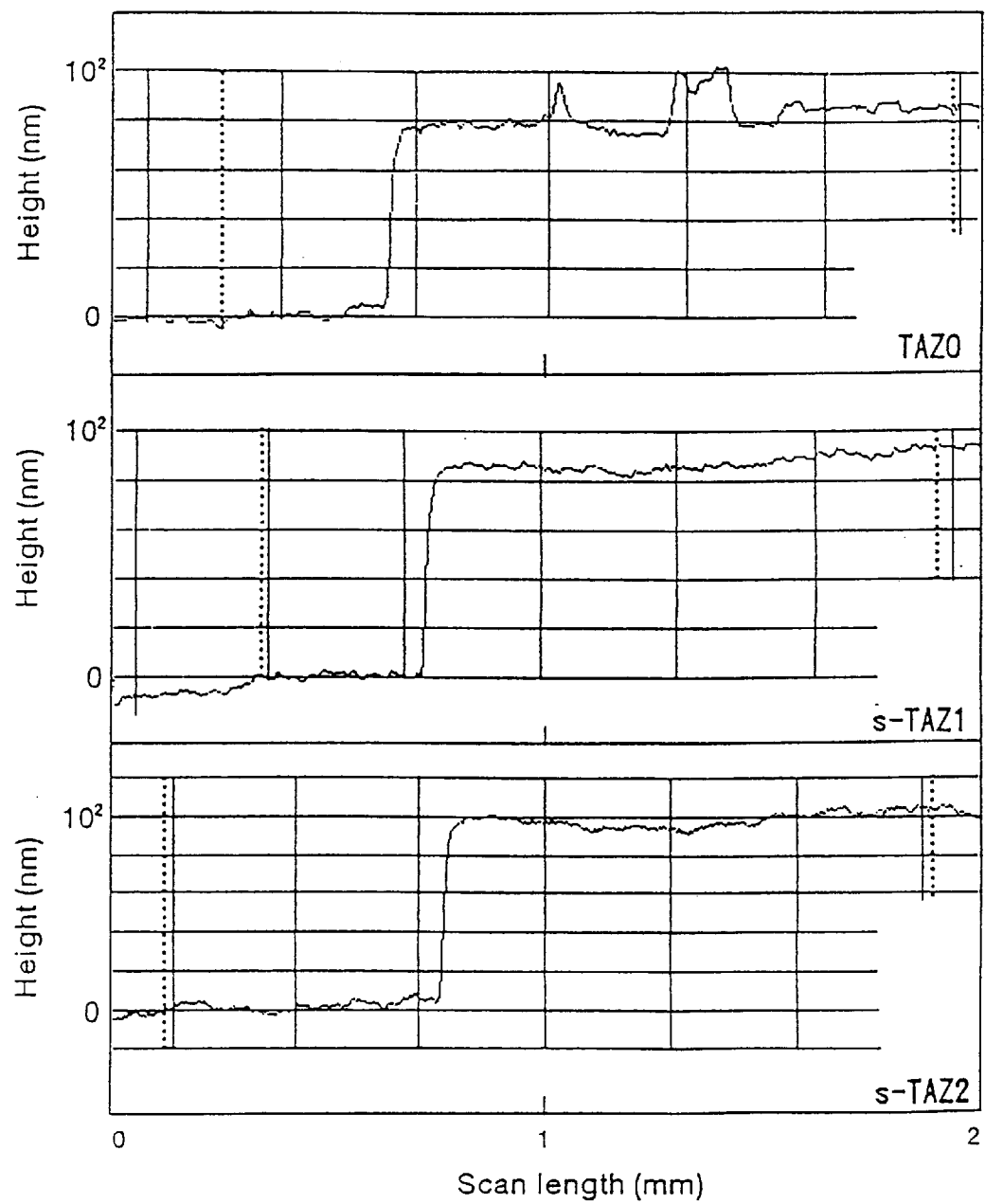
FIG. 9 is a graph illustrating the result of the surface condition of each deposited layer, measured after 48 hours from the standing in atmosphere.
Figure 10:
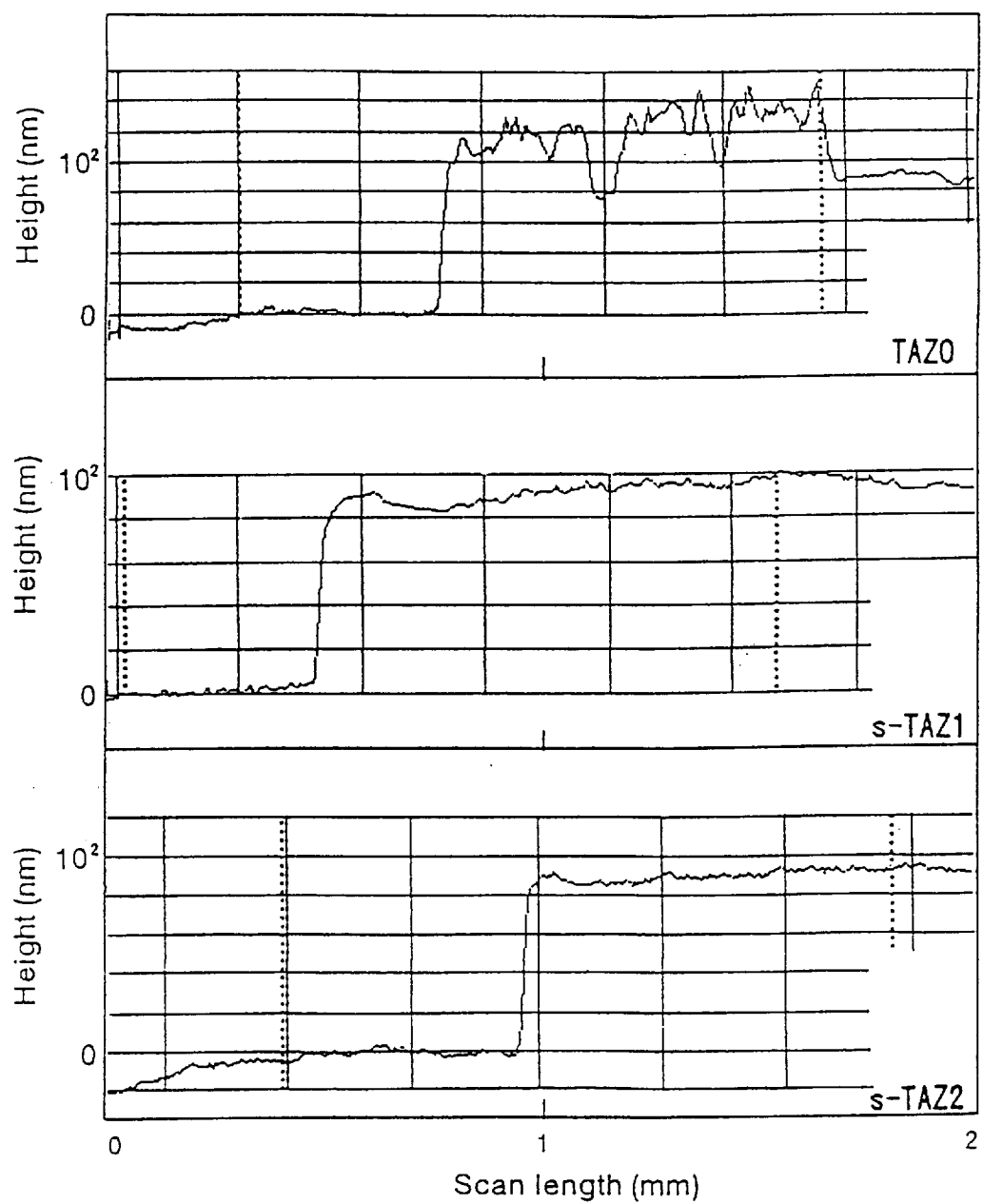
FIG. 10 is a graph illustrating the result of the surface condition of each deposited layer, measured after 96 hours from the standing in atmosphere.
Figure 11:
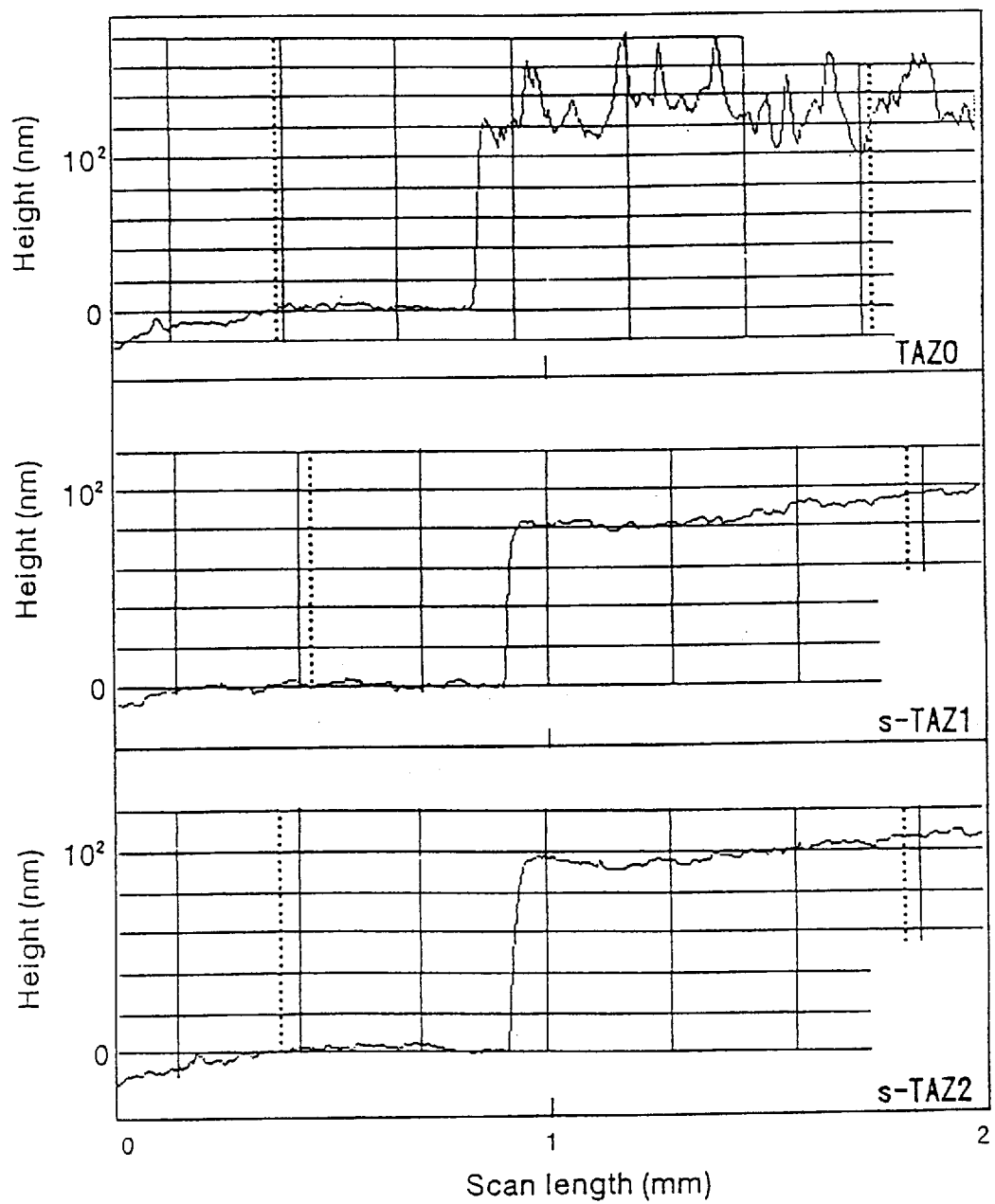
FIG. 11 is a graph illustrating the result of the surface condition of each deposited layer, measured after 168 hours from the standing in atmosphere.
Figure 12:
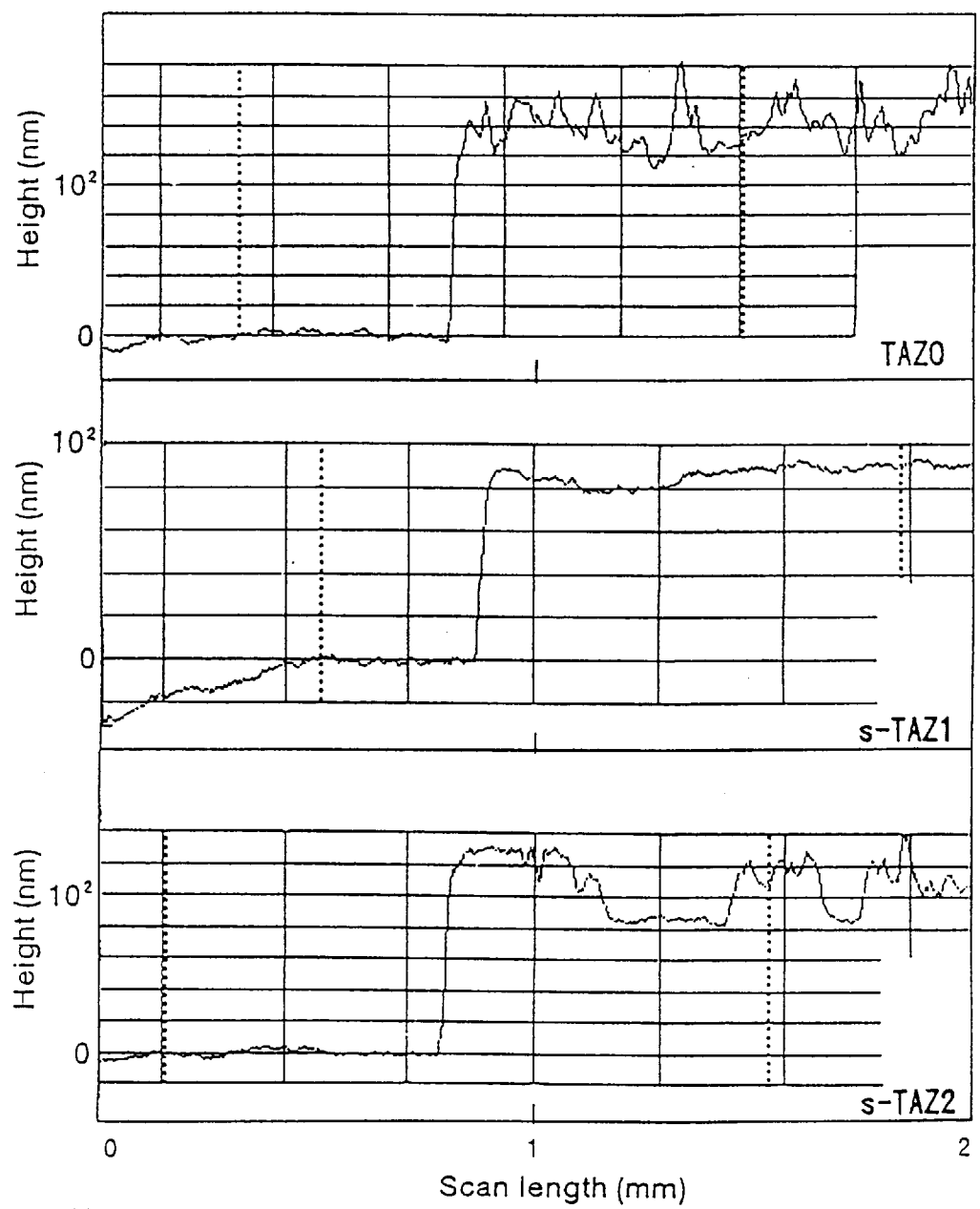
FIG. 12 is a graph illustrating the result of the surface condition of each deposited layer, measured after 384 hours from the standing in atmosphere.
Figure 13:
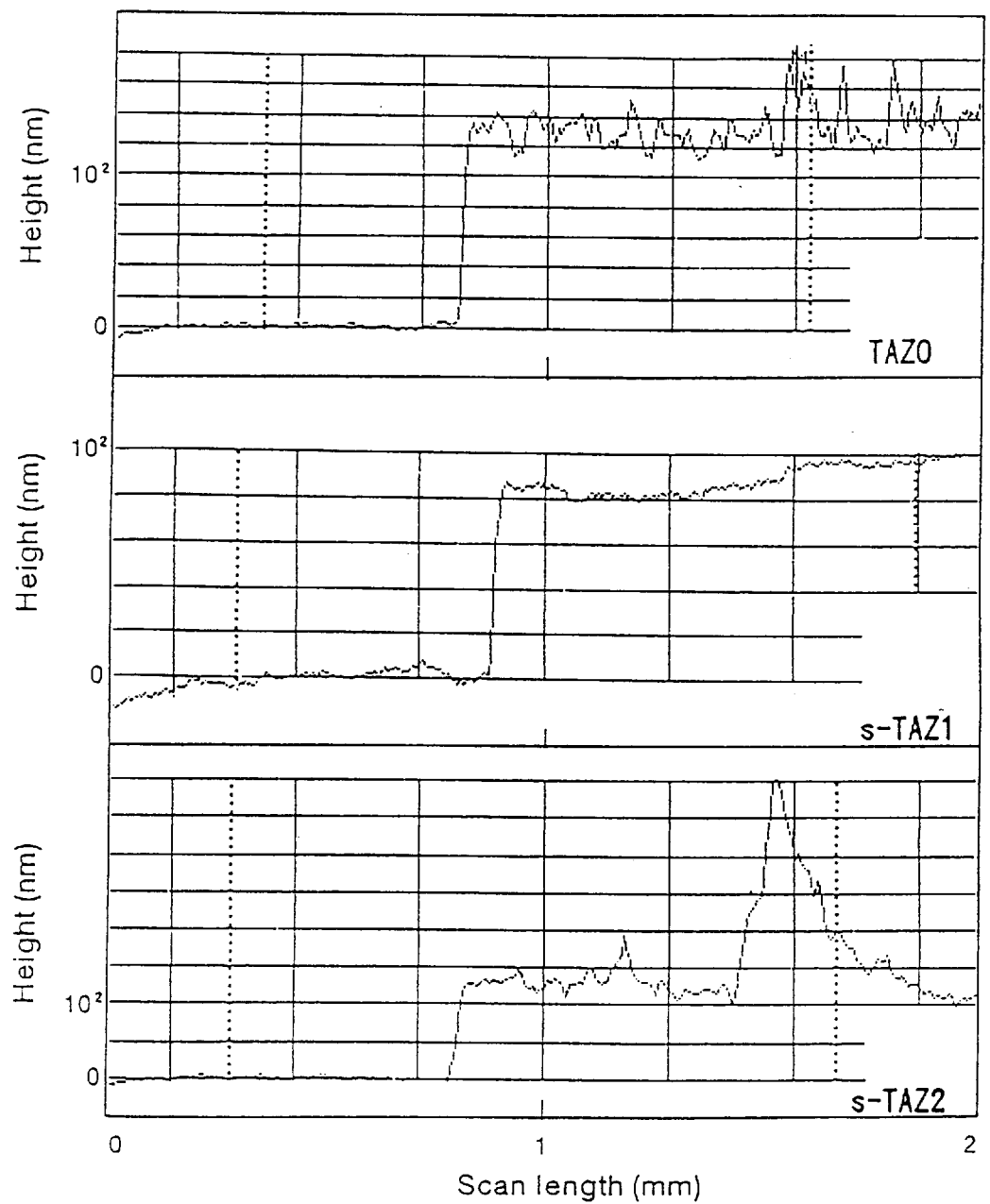
FIG. 13 is a graph illustrating the result of the surface condition of each deposited layer, measured after 552 hours from the standing in atmosphere. in atmosphere.

In the device having the two-layer structure comprising the TPD layer 10 and the Alq layer 3 (corresponding to the device of Tang et al.) as shown in FIG. 6, when a bias voltage is applied between the anode 40 and the cathode 5, holes are firstly injected into the TPD layer 10 and blocked on the TPD/Alq interface to form space charge (FIG. 6(*a*)).

At this time, the electric field strength applied on the Alq layer 3 becomes larger than the apparent electric field strength applied between the electrodes 40, 5 due to the space charge on the TPD/Alq interface, thereby initiating the injection of electrons into the Alq layer 3 (FIG. 6(*b*)).

Then, excitons are generated by the combination of the holes and the electrons in the Alq layer 3 in the vicinity of the TPD/Alq interface (FIG. 6(*c*)), and then the Alq is excited to emit light.

When the s-TAZ layer is interposed between the TPD layer 10 and Alq layer 3, the order in which the holes and the electrons are injected are the same. When the thickness of the s-TAZ layer 23 is sufficiently large (e.g., about 150 Å or more) as shown in FIG. 3, the s-TAZ layer 23 exhibits excellent hole-blocking property as described above, so that the holes injected by the application of the bias voltage are blocked on the TPD/s-TAZ interface (FIG. 3(*a*)).

Figure 3:
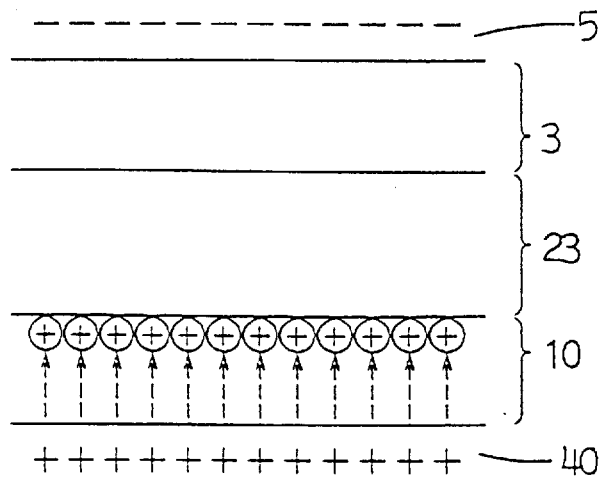
FIGS. 3($a$) to 3($c$) are schematic diagrams illustrating the principle of the light emission of the device wherein the thickness of the s-TAZ layer as a carrier-transport control layer is sufficiently large, out of the third organic electroluminescent device having the three-layer structure.
Figure 3:
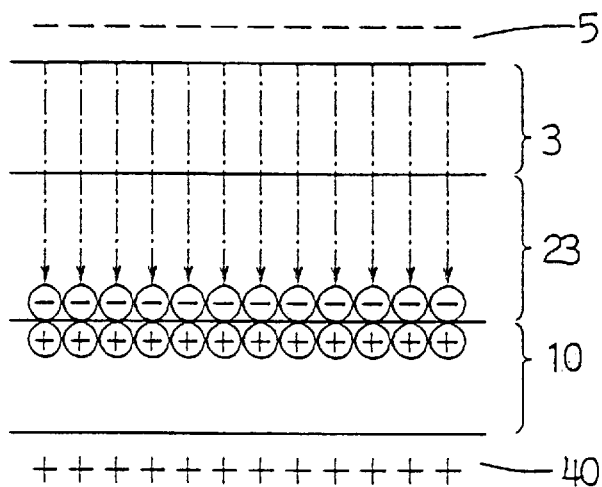
Figure 3:
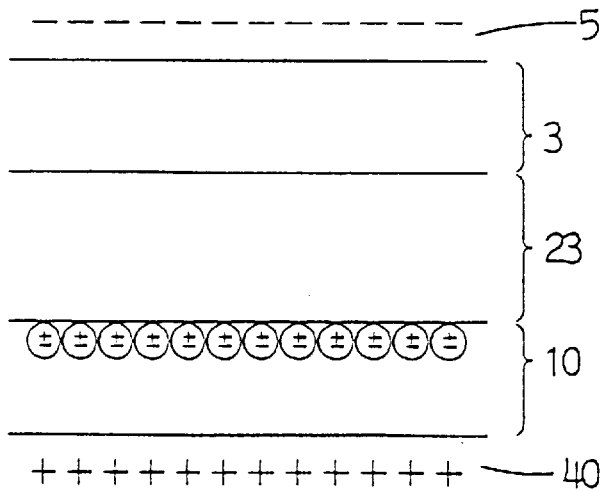

The electrons injected into the Alq layer 3 by the formation of the space charge due to the holes are transported to the TPD/s-TAZ interface (FIG. 3(*b*)) because the s-TAZ layer 23 is excellent in electron-transport property, and excitons are generated by the combination of the holes and the electrons (FIG. 3(*c*)) and the TPD whose excitation energy level is lower than that of the s-TAZ, is excited by the excitons thus generated to emit light.

Figure 4:
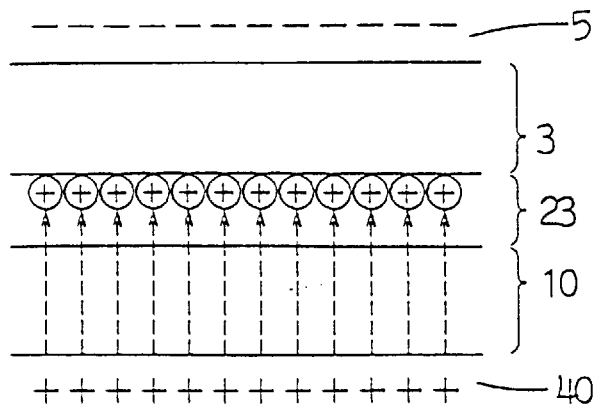
FIGS. 4($a$) to 4($c$) are schematic diagrams illustrating the principle of the light emission of the device wherein the thickness of the s-TAZ layer as a carrier-transport control layer is sufficiently small.
Figure 4:
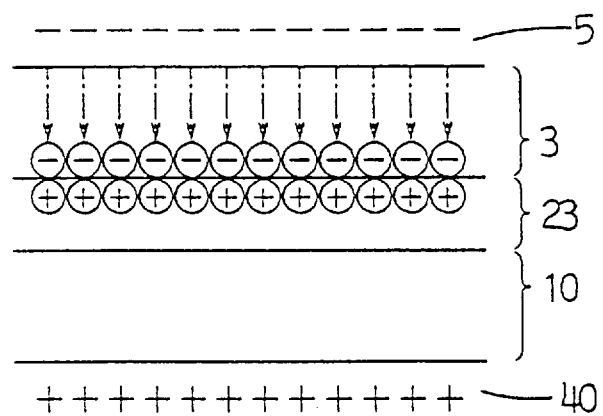
Figure 4:
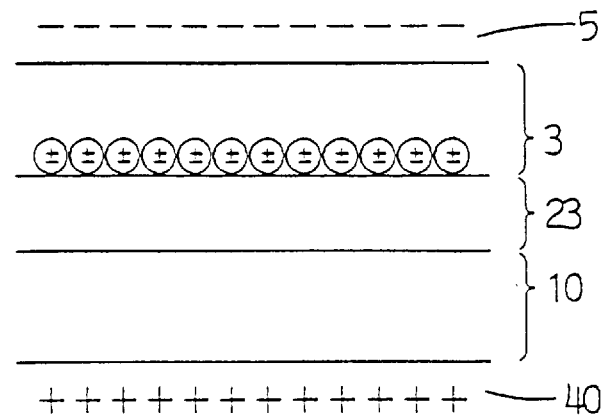

On the other hand, when the thickness of the s-TAZ layer 23 is sufficiently small (for example, about 50 Å or less), as shown in FIG. 4, the holes which is injected into the TPD layer 10 by applying the bias voltage between the electrodes 40, 5, pass through the s-TAZ layer 23 and are blocked on the s-TAZ/Alq interface to form space charge (FIG. 4(*a*)). The reason why the holes pass through the s-TAZ layer 23 is that the injection amount of the carriers (the holes in this case) is inversely proportional to the cubic of the thickness of the s-TAZ layer 23 being organic insulating layer.

Then, electrons are injected into the Alq layer 3 by the formation of the space charge due to the holes (FIG. 4(*b*)), and excitons are generated by the combination of the holes and the electrons on the s-TAZ/Alq interface (FIG. 4(*c*)), and then the Alq whose excitation energy level is lower than that of the s-TAZ is excited by the excitons to emit light.

Figure 5:
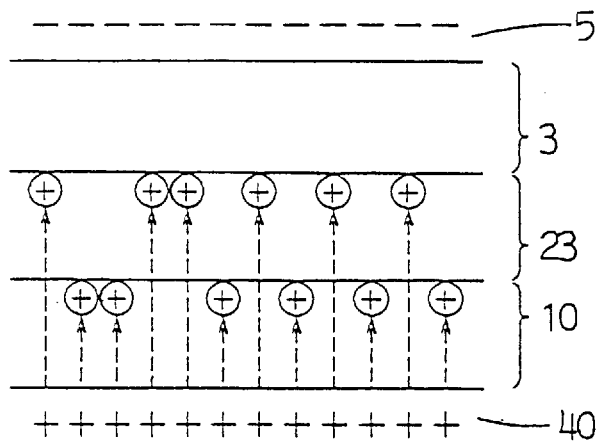
FIGS. 5($a$) to 5($c$) are schematic diagrams illustrating the principle of the light emission of the device wherein the thickness of the s-TAZ layer as a carrier-transport control layer is intermediate between those of FIGS. 3 and 4.
Figure 5:
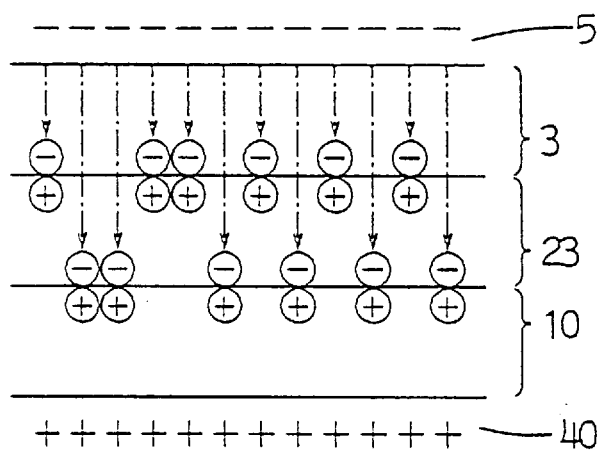
Figure 5:
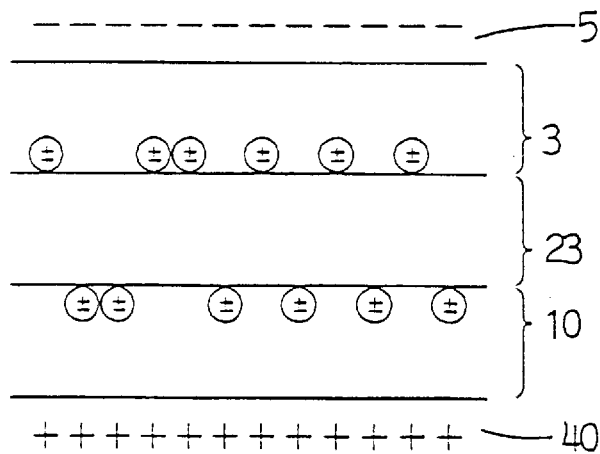

When the thickness of the s-TAZ layer 23 is intermediate of the above ranges (approx. from about 50 to about 150Å), some of the holes which are injected into the TPD layer 10 by applying the bias voltage between the electrodes 40, 5, are blocked on the TPD/s-TAZ interface, and the rest pass through the s-TAS layer 23 and are blocked on the s-TAZ/Alq interface (FIG. 5(*a*)).

And, when electrons are injected into the Alq layer 3 by the formation of the space charge due to the holes (FIG. 5(*b*)), excitons are generated by the combination of the holes and the electrons on both TPD/s-TAZ and s-TAZ/Alq interfaces (FIG. 5(*c*)), and then, the TPD and the Alq whose excitation energy levels are lower than that of the s-TAZ are excited by the excitons to emit light.

The reason why the injected holes are divided into the two types is that the injection amount of the holes is inversely proportional to the cubic of the thickness of the s-TAZ layer 23, as described above.

Since the s-TAZ layer 23 of the device in FIG. 5 allows both of the holes and the electrons to pass through, there is the possibility that the both may combine again in the s-TAZ layer 23. The s-TAZ, however, has a peak light emission in short wave length region of not more than 4000 nm. Therefore, even if the s-TAZ is excited by the excitons generated by the above combination, the excitation energy is transported to either or both of the TPD layer or/and the Alq layer whose peak light emissions are located in longer wave length region than that of the s-TAZ layer. Consequently, the s-TAZ layer 23 itself emits no light.

As can be evident from the above description, the function of the s-TAZ layer can be changed by adjusting its thickness within the above range, in the combination of the TPD layer 10, the s-TAZ layer 23 and the Alq layer 3. However, the correlation between the function of the carrier-transport control layer 23 and its thickness is not necessarily correspond with the above examples. The thickness range of the layer 23 having the specific function varies depending upon factors such as, material constituting the respective layers, the layer's structure (which is the deposited layer or the binder dispersed layer).

As seen from the description as to FIGS. 3 to 5, it is possible to change the ratio of the luminescent intensity of the hole-transport layer 10 and the electron-transport layer 3 by adjusting the thickness of the carrier-transport control layer 23 because the hole injection amount is inversely proportional to the cubic of the thickness.

Accordingly, the combination of the hole-transport layer 10 and the electron-transport layer 3 having mutually different spectrums as in the combination of the TPD layer and the Alq layer, permits the fine adjustment of the color tone of the overall luminescent color in which both layers' luminescent colors are being mixed, by suitably selecting the thickness of the carrier-transport control layer 23.

In the third device, it is essential to have the three layers comprising the hole-transport layer 10, the carrier-transport control layer 23 and the electron-transport layer 3. No other structural requirements are imposed thereon. Every layer can be formed by solution coating or vacuum deposition.

Field of the Industrial Applicability

As described above, in the first organic electroluminescent device, the hole-transport luminescent layer in which at least one sort of dye is molecularly dispersed in the disperse medium is combined with the electron-transport layer containing the s-TAZ of the general formula (1), which is excellent in electron-transport property and hole-blocking property. Thus the first device enables to improve the injection efficiency of carriers (particularly electrons) into the hole-transport luminescent layer, and the combination of holes and electrons within the hole-transport luminescent layer, compared with the conventional single-layer devices, so that the excitons can be efficiently confined into the hole-transport luminescent layer, enabling the hole-transport luminescent layer to emit light at high efficiency and high luminance.

In preparing the hole-transport luminescent layer, the dye is readily dispersed in the disperse medium by adjusting the solution, permitting the disperse of plural dyes at the same time. Therefore, the first device can realize pure multi-color displays, white light emission, natural light emission and the like due to three primary colors of R, G and B, depending upon the kind and the combination of dyes.

Since the s-TAZ resists its aggregation and its crystallization, a thin layer containing the s-TAZ presents little change in surface roughness with time and is excellent in heat stability, enabling to significantly prolong the lifetime of the device.

When the polymer is used as a disperse medium constituting the hole-transport luminescent layer, there are the following advantages: the heat stability of the hole-transport luminescent layer is improved and, since the polymer is excellent in adhesion to a substrate (e.g., ITO glasses and ITO films), the materials of the device is prevented from being deteriorated, aggregated and crystallized which are caused by heat generated by the device emitting light, so that the lifetime of the device is further prolonged.

In the second organic electroluminescent device, the s-TAZ layer which is particularly excellent in hole-blocking property, functions in improving the combination between electrons and holes, so that the excitons generated by the above combination can be more efficiently confined within the luminescent layer, compared with the conventional known devices. In addition, due to the s-TAZ having superior stability, the lifetime of the device can be significantly prolonged. Therefore, the second device presents high luminous efficiency, high luminance and high stability.

Further in accordance with the second device, it is possible to obtain blue light emission having high luminance which has been difficult to put into practical applications, by combining the s-TAZ excellent in hole-blocking property and the luminescent layer poor in luminous efficiency. Particularly the combination of the PVK layer which is capable of emitting blue light and is polymer, and the s-TAZ layer realizes an organic electroluminescent device for blue light emission which has still higher efficiency and luminance and is excellent in stability. The incorporation of the Alq layer into the above combination can further increase the efficiency, the luminance and the stability.

In the third organic electroluminescent device, the carrier-transport control layer containing the s-TAZ is interposed between the hole-transport layer and the electron-transport layer. Therefore, due to the effect that the carrier-transport control layer confines excitons, it is possible to allow either of the hole-transport layer and the electron-transport layer to emit light at high luminance and high efficiency as a luminescent layer. This enables to improve the luminous efficiency, the luminance and the stability resulting from the luminance, and to raise the luminous efficiency for blue light emission to the practical level. In addition, due to the s-TAZ having superior stability, the lifetime of the device can be significantly increased.

Moreover, by adjusting the thickness of the s-TAZ layer, either or both of the hole-transport layer and the electron-transport layer are allowed to emit light at high luminance and high efficiency. Therefore, by adding materials having different emission spectrums to the hole-transport layer and the electron-transport layer, respectively, even a single device can emit light having two or more emission spectrums, and can obtain the multi-color displays and white light emission, as described above.

Accordingly, the three types of the organic electroluminescent devices as described can be driven at low voltage, and are useful for producing large-area luminescent devices having flexibility because they are composed of organic material. Thus there are a great applicability in the fields of indications, illuminations and displays.

EXAMPLES

The invention will be better understood by the following Examples and Comparative Example which show by way of example.

Evaluation of stability for s-TAZ

The s-TAZ1 of the formula (1a) and the s-TAZ2 of the formula (1b) which belong to the s-TAZ of the general formula (1), and TAZ 0 of the formula (2) are separately deposited on an ITO (indium-tin-oxide) coated glass substrate (the ITO thickness ranges from 1500 to 1600 Å, available from Asahi Glass Co., Ltd.) by vacuum deposition to form a layer having the thickness of 1000 Å. The deposition conditions were:

Vacuum pressure: 1 to $2 \times 10^{-5}$ Torr;

Temperature of the substrate: Room temperature; and

Deposition rate: 2 to 4 Å/sec.

Each specimen was allowed to stand in atmosphere at room temperature. The surface of each layer of specimen is measured using a surface roughness tester at certain intervals to evaluate the smoothness. FIGS. 7 to 13 show the results of just after the standing, 24 hours, 48 hours, 96 hours, 168 hours, 384 hours and 552 hours since the specimen is allowed to stand, respectively. In each figure, the upper, the middle and the bottom graphs indicate the results of the TAZ 0, the s-TAZ1 and the s-TAZ2 layers, respectively.

The results show the following matters:

(i) New unevenness occurred on the surface of the TAZ 0 layer after an elapse of 48 hours after the standing and the aggregation, and the crystallization of the TAZ 0 observed;

(ii) The s-TAZ1 layer presented no new unevenness even after 552 hours; and (iii) The s-TAZ2 layer presented no new unevenness until an elapse of 384 hours.

From these, it was confirmed that the s-TAZ1 layer and the s-TAZ2 layer have smoothness and stability superior to those of the TAZ 0 layer, significantly prolonging the lifetime of the specimen.

Example 1

The PVK of the formula (3), 5 molar % (for the PVK) of the TPB of the formula (4), 0.3 molar % (for the PVK) of coumarine 6 of the formula (5) and 0.3 molar % (for the PVK) of the DCM of the formula (7) were dissolved in dichloromethane to prepare a coating solution. The coating solution was applied on an ITO (indium-tin-oxide) coated glass substrate having the sheet resistance of 15 Ω/□ (the ITO thickness: 1500 to 1600 Å, available from Asahi Glass Co., Ltd.) by dip coating, followed by drying to form a hole-transport luminescent layer.

Then, on the hole-transport luminescent layer, the s-TAZ1 of the formula (1a) and the Alq of the formula (9) as electron-transport materials were deposited in this order by vacuum deposition to form an electron-transport layer having the two-layer structure as shown in FIG. 1(a). The luminescent region was the square being 0.5 cm in side. The deposition conditions for the s-TAZ layer and the Alq layer were as follows:

Vacuum pressure: 1 to $2 \times 10^{-5}$ Torr;

Temperature of the substrate: Room temperature; and

Deposition rate: 2 to 4 Å/sec.

The thickness of each layer was:

The hole-transport luminescent layer: 400 to 500 Å;

The s-TAZ layer: 200Å; and

The Alq layer: 300 Å.

Then, on the Alq layer, magnesium and silver were deposited together to form an Mg/Ag electrode layer having the thickness of 2000 Å [Mg/Ag=10/1 (molar ratio)], on which silver was deposited singly to form a protective layer having the thickness of 1000 Å, thus obtaining an organic electroluminescent device having the layer structure shown in FIG. 1(a). The deposition rate for the electrode layer and that of the protective layer were 11 Å/sec. and 10 Å/sec., respectively.

The ITO layer and the Mg/Ag electrode layer thus prepared were employed as an anode and a cathode, respectively, and a bias voltage was applied between the anode and the cathode in atmosphere at room temperature to allow the luminescent layer to emit light. Its luminance was measured using a luminance meter (Model No. LS-100, available from Minolta Co., Ltd.). There was observed white light emission having the luminance of 3352 cd/m² at the drive voltage of 16 V and the current density of 250 mA/cm².

Figure 14:
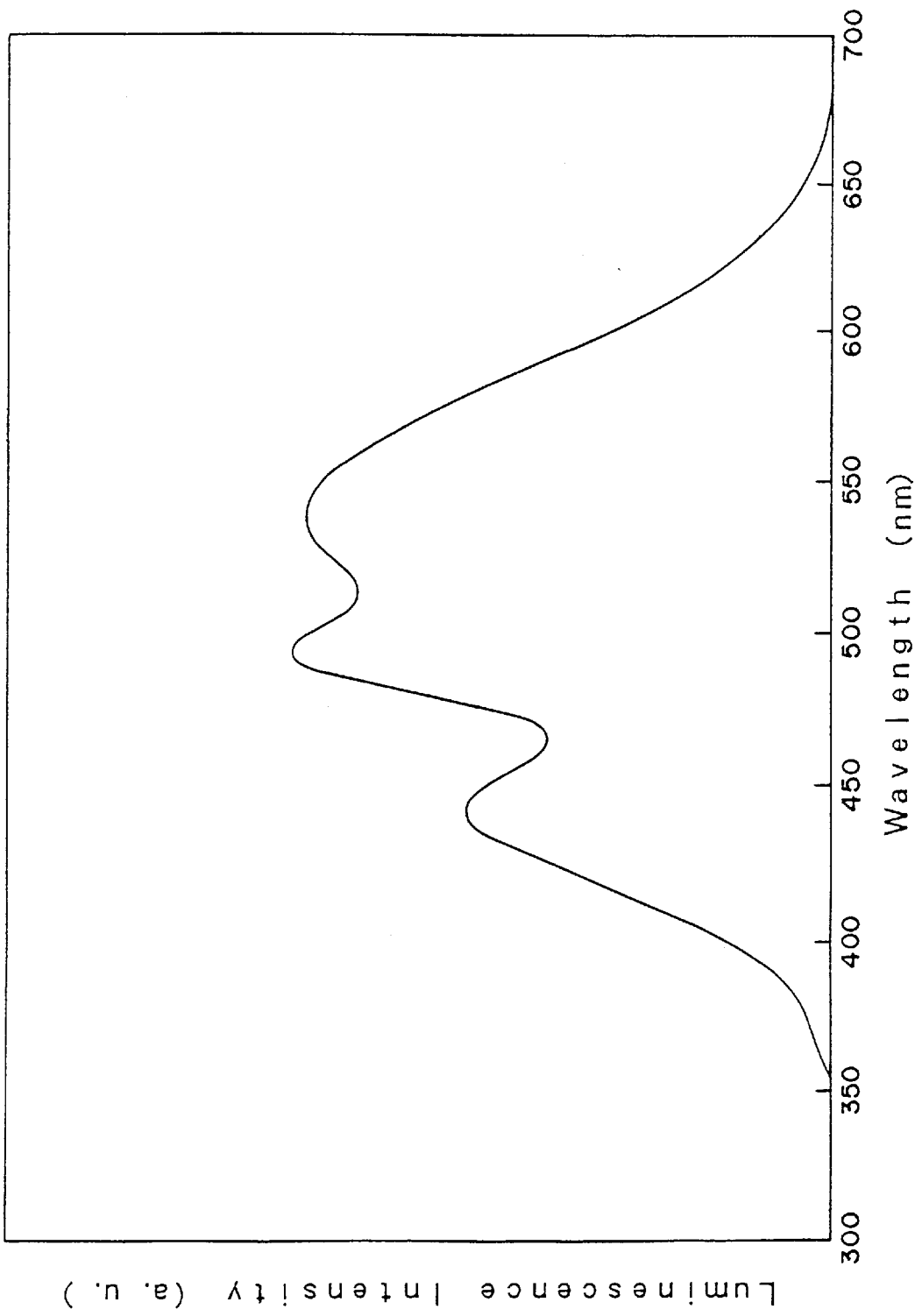
FIG. 14 is a graph illustrating the measurement results of the emission spectrum of the organic electroluminescent device prepared in Example 1.

The white light emission was measured at room temperature using a fluorescencephotometer (Model No. F4010, available from Hitachi Co., Ltd.). There was obtained an emission spectrum that extended over the visible region having the wave length ranging from 400 to 700 nm, as shown in FIG. 14.

Even when the device was preserved at room temperature for several days, its appearance remained unchanged and its luminance was virtually invariant.

Further, this device was allowed to continuously emit light at the initial luminance of 100 cd/m² at room temperature under inert gas atmosphere, the emission continued for not less than one month.

Comparative Example 1

The procedure of Example 1 was repeated except that the TAZ 0 of the formula (2) was used as an electron-transport material in place of the s-TAZ1, to obtain an organic electroluminescent device. This device was allowed to continuously emit light at the initial luminance of 100 cd/m² at room temperature under inert gas atmosphere. The duration of the emission was 10 hours.

Example 2

The procedure of Example 1 was repeated except that the coating solution was prepared by dissolving the PVK and 5 molar % (for the PVK) of the TPB in dichloromethane, to obtain an organic electroluminescent device, and its characteristics were examined.

There was observed blue light emission having the luminance of 1500 cd/m² at the drive voltage of 16 V and the current density of 220 mA/cm².

Figure 15:
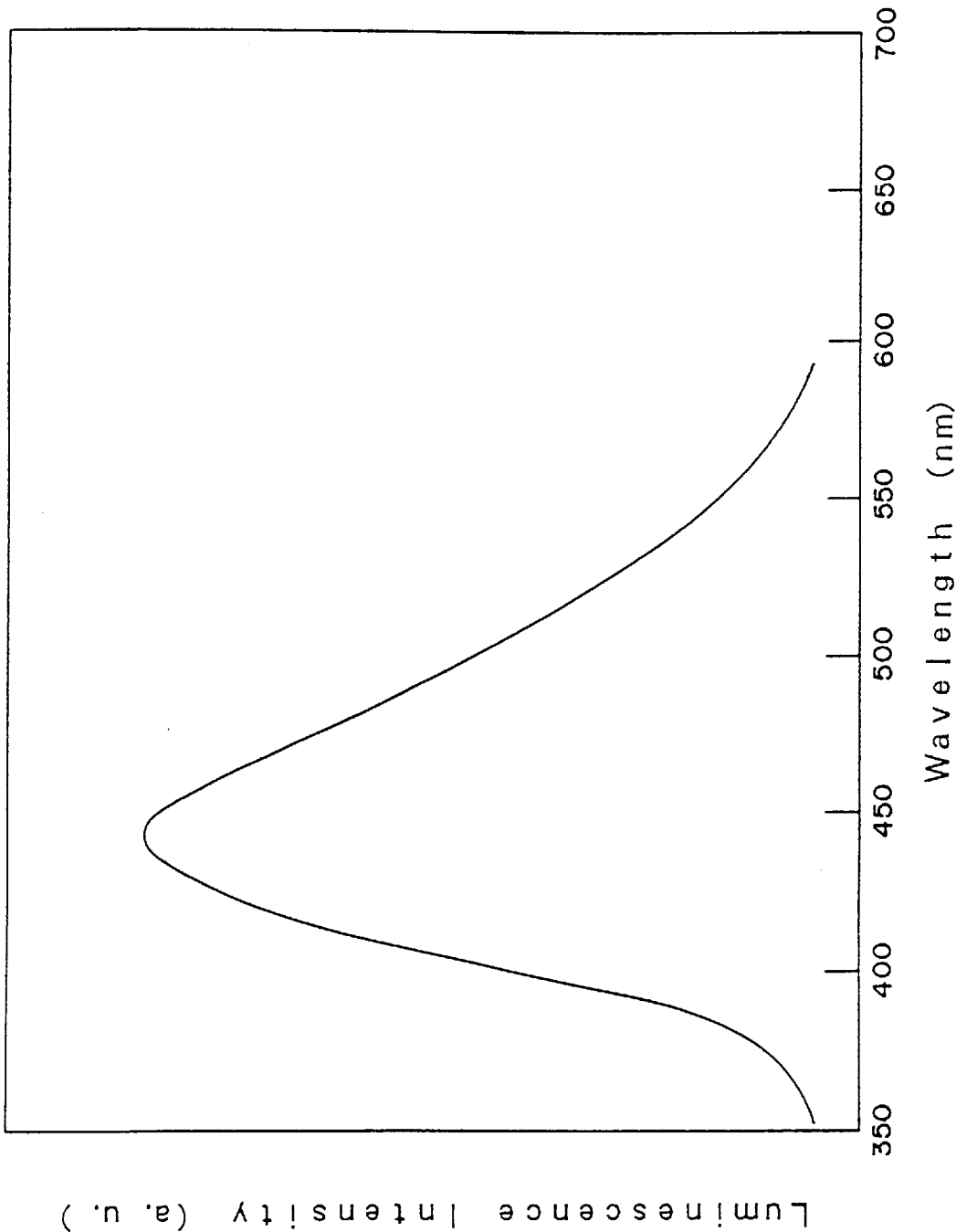
FIG. 15 is a graph illustrating the measurement results of the emission spectrum of the organic electroluminescent device prepared in Example 3.

The blue light emission was measured using the aforesaid fluorescencephotometer to obtain an emission spectrum having a peak at the wave length of 450 nm, as shown in FIG. 15. Thus it was confirmed that the blue light emission originated from the TPB.

Even when this device was preserved at room temperature for several days, its appearance remained unchanged and its luminance was virtually invariant.

Further, this device was allowed to continuously emit light at the initial luminance 100 cd/m² at room temperature under inert gas atmosphere, the emission continued for not less than one month.

Comparative Example 2

The procedure of Example 2 was repeated except that the TAZ 0 was used as an electron-transport material in place of the s-TAZ1, to obtain an organic electroluminescent device. This device was allowed to continuously emit light at the initial luminance of 100 cd/m² at room temperature under inert gas atmosphere. The duration of the emission was 14 hours.

Example 3

The procedure of Example 1 was repeated except that the coating solution was prepared by dissolving the PVK and 1 molar % (for the PVK) of the coumarine 6 in dichloromethane, to obtain an organic electroluminescent device, and its characteristics were examined.

There was observed green light emission having the luminance of 2200 cd/m² at the drive voltage of 16 V and the current density of 340 mA/cm².

Figure 16:
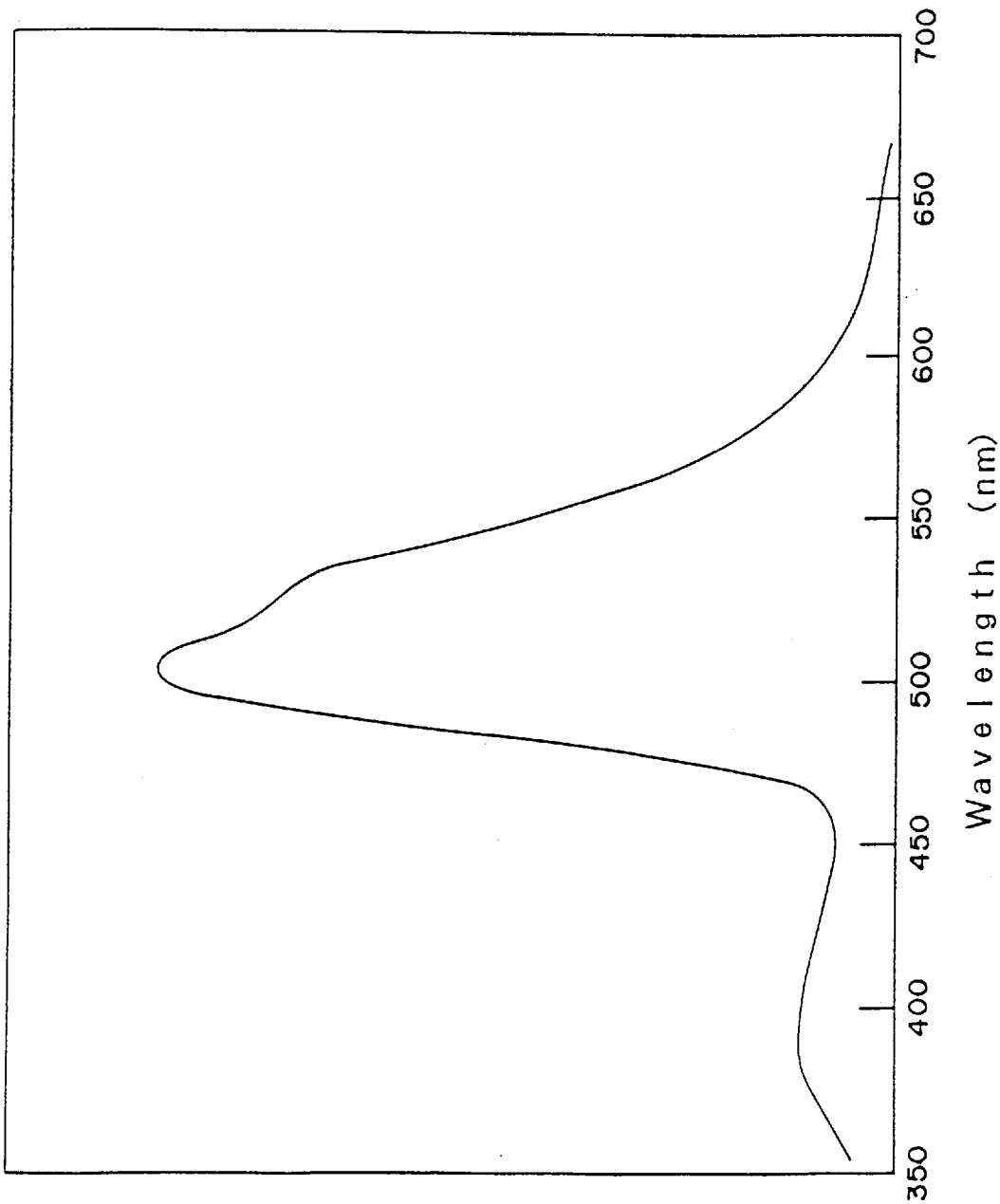
FIG. 16 is a graph illustrating the measurement results of the emission spectrum of the organic electroluminescent device prepared in Example 5.

The green light emission was measured using the aforesaid fluorescencephotometer to obtain an emission spectrum having a peak at the wave length of 510 nm, as shown in FIG. 16. It was confirmed that the green light emission originated from the coumarine 6.

Even when this device was preserved at room temperature for several days, its appearance remained unchanged and its luminance was virtually invariant.

Further, this device was allowed to emit light at the initial luminance 100 cd/m² at room temperature under inert gas atmosphere, the emission continued for not less than one month.

Comparative Example 3

The procedure of Example 3 was repeated except that the TAZ 0 was used as an electron-transport material in place of the s-TAZ1, to obtain an organic electroluminescent device. This device was allowed to continuously emit light the initial luminance of 100 cd/m$^2$ at room temperature under inert gas atmosphere. The duration of the emission was 15 hours.

Example 4

The procedure of Example 1 as repeated except that the coating solution was prepared by dissolving the PVK and 0.1 molar % (for the PVK) of the DCM in dichloromethane, to obtain an organic electroluminescent device, and its characteristics were examined.

There was observed white light emission having the luminance of 1100 cd/m$^2$ at the drive voltage of 16 V and the current density of 210 mA/cm$^2$.

Figure 17:
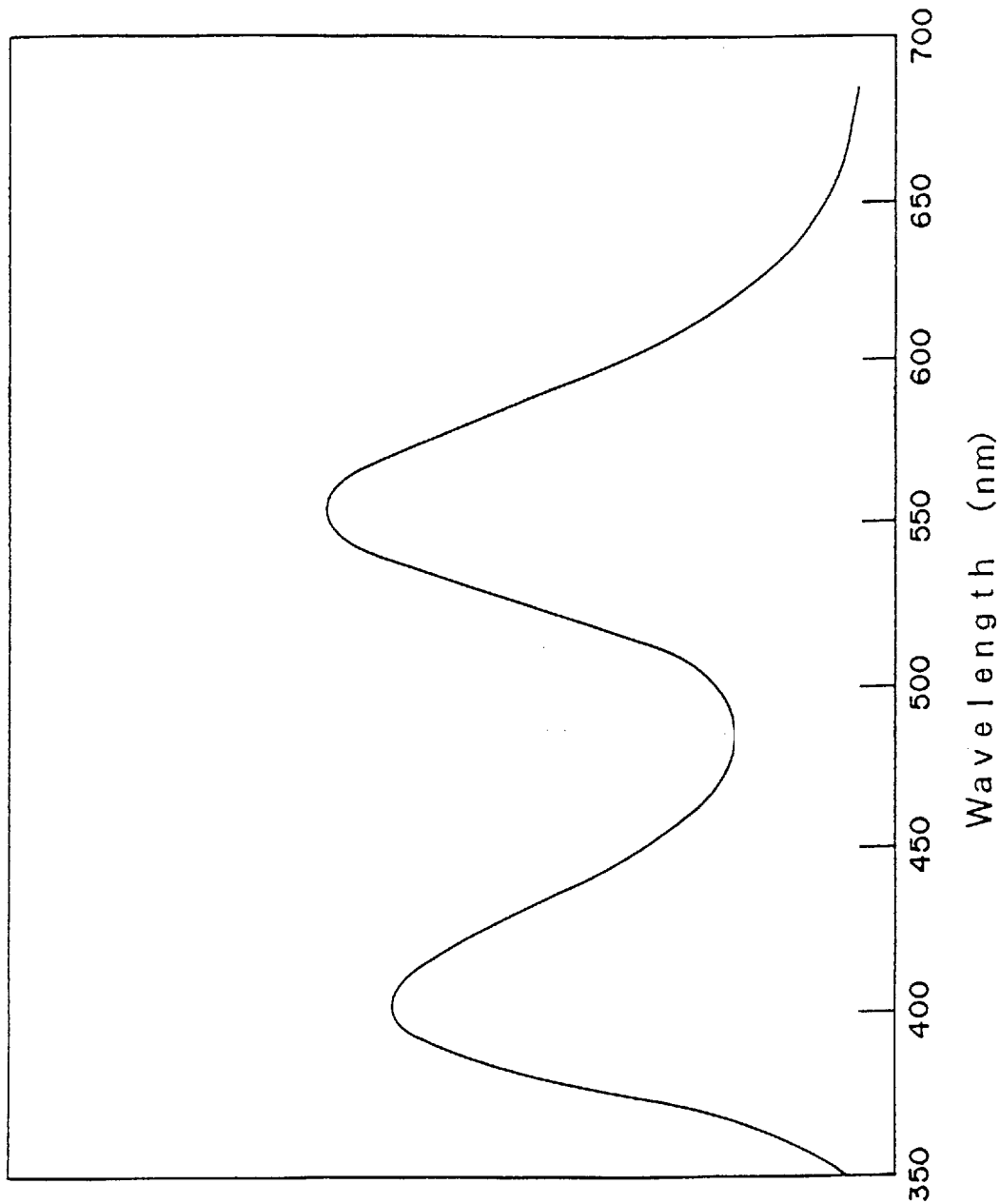
FIG. 17 is a graph illustrating the measurement results of the emission spectrum of the organic electroluminescent device prepared in Example 7.

The white light emission was measured using the aforesaid fluorescencephotometer, and it was confirmed that the white light emission was composed of the light emission of the PVK having the wave length of 410 nm and that of the DCM having the wave length of 550 nm, as shown in FIG. 17.

Separately, another organic electroluminescent device was obtained in the same manner as described except that the DCM concentration for the PVK was changed to 2 molar %, and its characteristics were examined.

It was confirmed that the peak value at the wave length of 550 nm became larger than that of 410 nm, resulting in orange light emission.

Even when these devices were preserved at room temperature for several days, each appearance remained unchanged and each luminance was virtually invariant.

Further, these device were allowed to continuously emit light at the initial luminance 100 cd/m$^2$ at room temperature under inert gas atmosphere, the emission of each device continued for not less than one month.

Comparative Example 4

The procedure of Example 4 was repeated except that the TAZ 0 was used as an electron-transport material in place of the s-TAZ1, to obtain an organic electroluminescent device. This device was allowed to continuously emit light at the initial luminance of 100 cd/m$^2$ at room temperature under inert gas atmosphere. The duration of the emission was 8 hours.

Example 5

On an ITO (indium-tin-oxide) coated glass substrate having the sheet resistance of 15 Ω/□ (the ITO thickness: 1500 to 1600 Å, available from Asahi Glass Co., Ltd.), a layer of the PVK of the formula (3) as a hole-transport luminescent material was formed by dip coating using dichloromethane as a solvent, on which the s-TAZ1 of the formula (1a) and the Alq of the formula (9) as an electron-transport material were deposited in this order by vacuum deposition. The luminescent region was represented by the square being 0.5 cm in side. The deposition conditions was same as in Example 1.
The thickness of each layer was:
  The PVK layer (the hole-transport layer): 400 Å;
  The s-TAZ layer: 200 Å, and
  The Alq layer (the electron-transport layer): 300 Å.

Then, on the Alq layer, magnesium and silver were deposited together to form an Mg/Ag electrode layer having the thickness of 2000 Å [Mg/Ag=10/1 (molar ratio)], on which silver was deposited singly to form a protective layer having the thickness of 1000 Å, thus obtaining an organic electroluminescent device having the layer structure shown in FIG. 2(a). The deposition rate for the electrode layer and the protective layer were same as in Example 1.

The ITO film and the Mg/Ag electrode layer thus prepared were used as an anode and a cathode, respectively, and a bias voltage was applied between the anode and the cathode in atmosphere at room temperature to allow the luminescent layer to emit light. Its luminance was measured using the aforesaid luminance meter. The light emission was started at 4 V and there was observed blue light emission having the luminance of 1500 cd/m$^2$ at the drive voltage of 15 V (270 mA/cm$^2$). Referring that the luminance for the blue region of CRT is about 20 to 30 cd/m$^2$, it was confirmed that the above blue light emission was of extremely high luminance.

The blue light emission was measured using the aforesaid fluorescencephotometer to obtain an emission spectrum having a peak at the wave length of 410 nm. This showed that the blue light emission originated from the PVK layer because the spectrum virtually corresponded to that of the PVK itself.

When this device was allowed to continuously emit light at the initial luminance of 100 cd/m$^2$ under inert gas atmosphere at room temperature, the emission continued for not less than one month.

Comparative Example 5

The procedure of Example 5 was repeated except that the TAZ 0 was used in place of the s-TAZ1, to obtain an organic electroluminescent device. This device was allowed to continuously emit light at the initial luminance of 100 cd/m$^2$ under inert gas atmosphere at room temperature. The duration of the emission was 10 hours.

Example 6

The procedure of Example 5 was repeated except that the Alq layer was omitted, to obtain an organic electroluminescent device. Its characteristics were examined and it was confirmed that although the voltage with which the light emission started was a little higher than that of Example 5, blue light emission whose luminance was as high as Example 5.

This device was allowed to continuously emit light at the initial luminance of 100 cd/m$^2$ under inert gas atmosphere at room temperature. The emission was continued not less than one month.

Comparative Example 6

The procedure of Example 6 was repeated except that the TAZ 0 was used in place of the s-TAZ1, to obtain an organic electroluminescent device. This device was allowed to continuously emit light at the initial luminance of 100 cd/m$^2$ under inert gas atmosphere at room temperature. The duration of the emission was 1 hour.

Example 7

On an ITO (indium-tin-oxide) coated glass substrate having the sheet resistance of the maximum 15 Ω/□ (the ITO thickness: 1500 to 1600 Å, available from Asahi Glass Co., Ltd.), the TPD, s-TAZ2 and the Alq were deposited in this order by vacuum deposition. The luminescent region was represented by the square being 0.5 cm in side. The deposition conditions was same as in Example 1.

The thickness of each layer was:

The TPD layer (the hole-transport layer): 400 Å;

The s-TAZ layer(the carrier transport control layer): 150 Å

The Alq layer (the electron-transport layer): 450 Å.

Then, on the Alq layer, magnesium and silver were deposited together to form an Mg/Ag electrode layer having the thickness of 2000 Å [Mg/Ag=10/1 (molar ratio)], on which silver was deposited singly to form a protective layer having the thickness of 1000 Å, thus obtaining an organic electroluminescent device having the layer structure shown in FIG. 2(b). The deposition rate for the electrode layer and the protective layer were same as in Example 1.

The ITO film and the Mg/Ag electrode layer thus prepared were used as an anode and a cathode, respectively, and the bias voltage was applied between the anode and the cathode in atmosphere at room temperature to allow the luminescent layer to emit light. Its luminance was measured using the aforesaid luminance meter to obtain blue light emission having the luminance of 6000 cd/m$^2$ at the maximum drive voltage of 15 V (200 mA/cm$^2$).

The blue light emission was measured using the aforesaid fluorescencephotometer to obtain an emission spectrum having a peak at the wave length of 464 nm. This showed that the blue light emission originated from the TPD layer because the spectrum virtually corresponded to that of the deposited layer of the TPD alone.

When this device was allowed to continuously emit light at the initial luminance of 100 cd/m$^2$ under inert gas atmosphere at room temperature, the emission continued for not less than five days.

Examples 8–9

The procedure of Example 7 was repeated except that a deposited layer of the s-TAZ1 having the thickness of 50 Å (Example 8) or 100 Å (Example 9) was used as a carrier transport control layer in place of the s-TAZ layer, to obtain each organic electroluminescent device.

Comparative Example 7

The procedure of Example 7 was repeated except that a deposited layer of the TAZ 0 having the thickness of 100 Å was used as a carrier transport control layer in place of the sTAZ layer, to obtain organic electroluminescent device.

The emission spectrums of Example 8, 9 and Comparative Example 7 were measured in the same manner as in Example 7. The luminescent color of Example 8 or Comparative Example 7 was one in which the blue light emission originated from the TPD layer and the green light emission originated from the Alq layer were being mixed. On the other hand, the luminescent color of Example 9 was blue originated from the TPD layer. This showed that the s-TAZ layer containing the sTAZ1 had a higher hole-blocking property than the s-TAZ layer containing the TAZ 0.

What we claim is:

1. An organic electroluminescent device comprising:

an electron transport layer which comprises a single layer of an 1,2,4-triazole derivative of the formula:

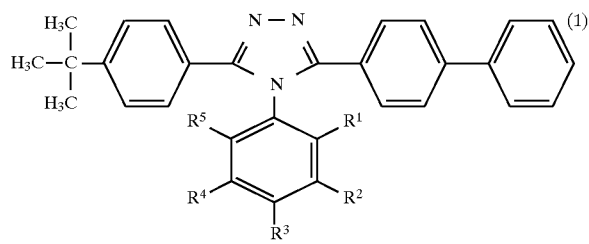

wherein R$^1$, R$^2$, R$^3$, R$^4$ and R$^5$ may be the same or different, each is hydrogen atom, alkyl, alkoxyl, aryl or aralkyl, and R$^1$, R$^2$, R$^3$, R$^4$ and R$^5$ are not hydrogen atoms at the same time, or comprises the layer of the 1,2,4-triazole derivative and a layer of a tris(8-quinolinolato)aluminum (III) complex; and a hole-transport luminescent layer in which at least one dye is molecularly dispersed in a disperse medium.

2. An organic electroluminescent device according to claim 1, wherein the hole-transport luminescent layer is prepared by molecularly dispersing a dye into a disperse medium having carrier-transport property, or by molecularly dispersing a dye and a hole-transport material having low molecular-weight into a disperse medium having no carrier-transport property.

3. An organic electroluminescent device according to claim 1, wherein the disperse medium is a polymer.

4. An organic electroluminescent device according to claim 1, wherein a plurality of dyes are dispersed into the hole-transport luminescent layer in order that an emission spectrum of the hole-transport luminescent layer extends over a visual region ranging from 400 to 700 nm.

5. An organic electroluminescent device having at least a layer of a 1,2,4-triazole derivative of the formula:

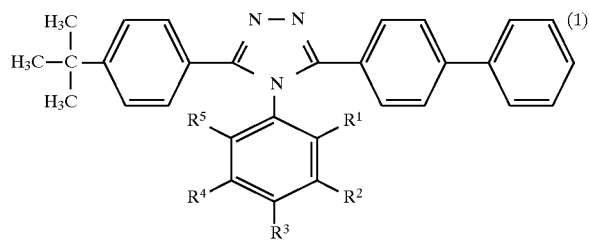

wherein R$^1$, R$^2$, R$^3$, R$^4$ and R$^5$ may be the same or different, and each is a member selected from the group consisting of hydrogen, alkyl, alkoxyl, aryl and aralkyl, with the proviso that R$^1$, R$^2$, R$^3$, R$^4$ and R$^5$ are not all hydrogen at the same time.

6. An organic electroluminescent device according to claim 5, said device having a layer of a poly-N-vinylcarbazole as a hole-transport luminescent layer.

7. An organic electroluminescent device according to claim 5, said device having a layer of a tris(8-quinolinolato) aluminum (III) as a hole-transport luminescent layer.

8. An organic electroluminescent device comprising:

a hole-transport layer;

an electron-transport layer; and a carrier-transport control layer being interposed between the hole-transport layer and the electron-transport layer, the carrier-transport control layer being composed of a 1,2,4 -triazole derivative of the general formula (1), transporting at least either of holes and electrons.

* * * * *